C. S. WICKES.
MOLDING PRESS.
APPLICATION FILED DEC. 11, 1913.

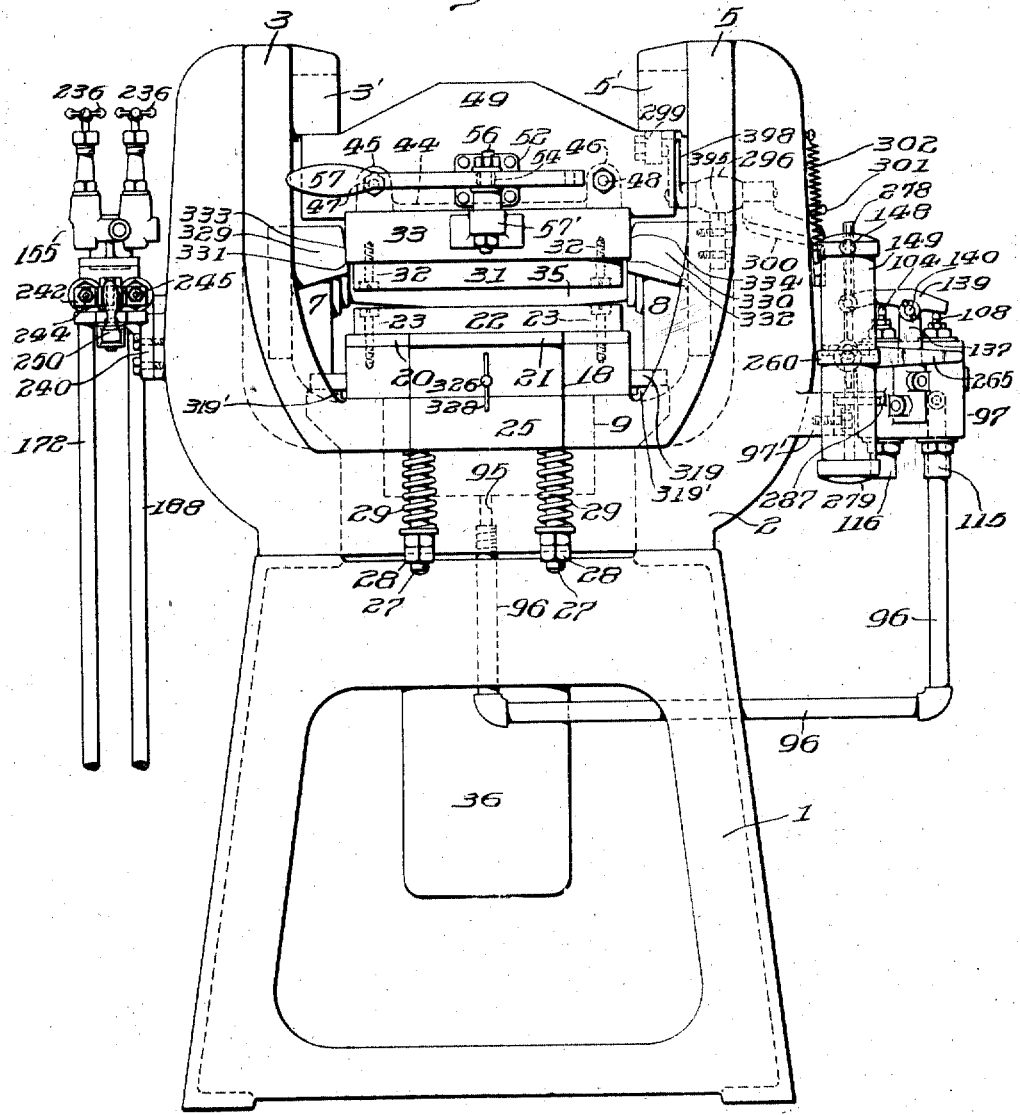

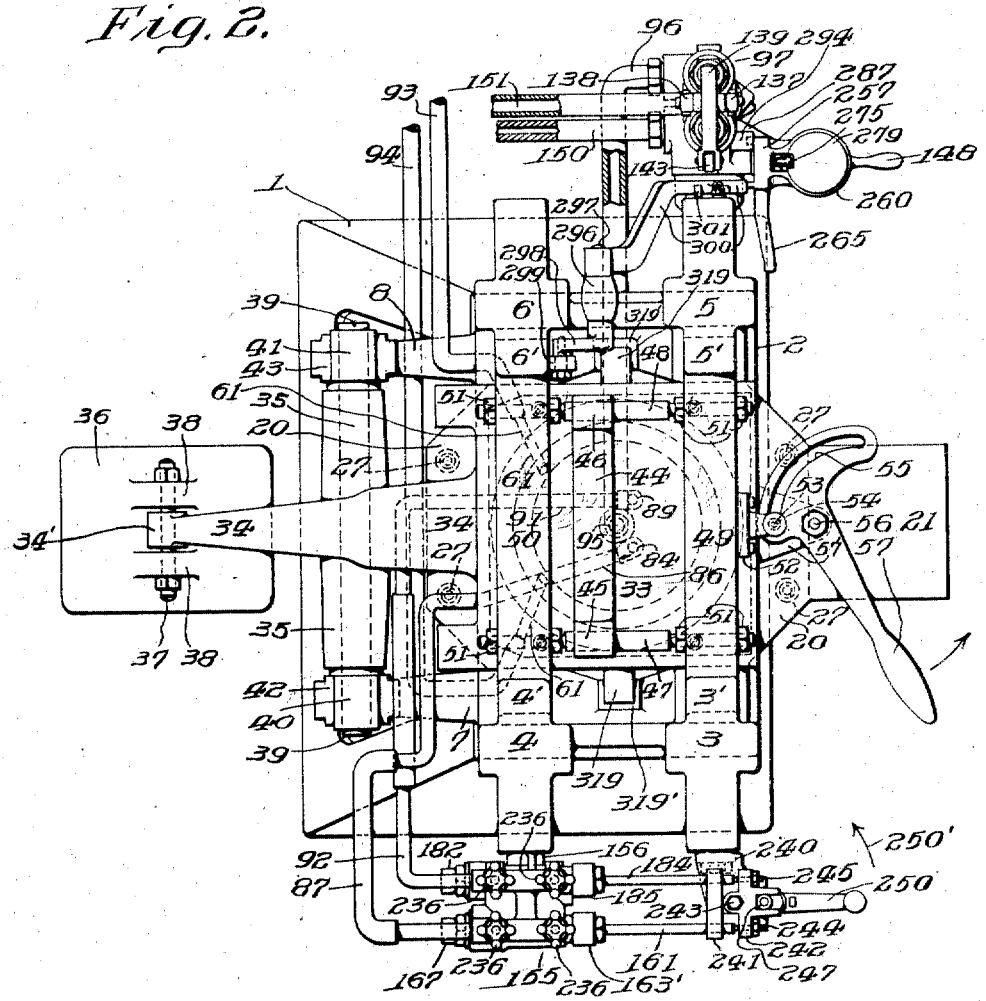

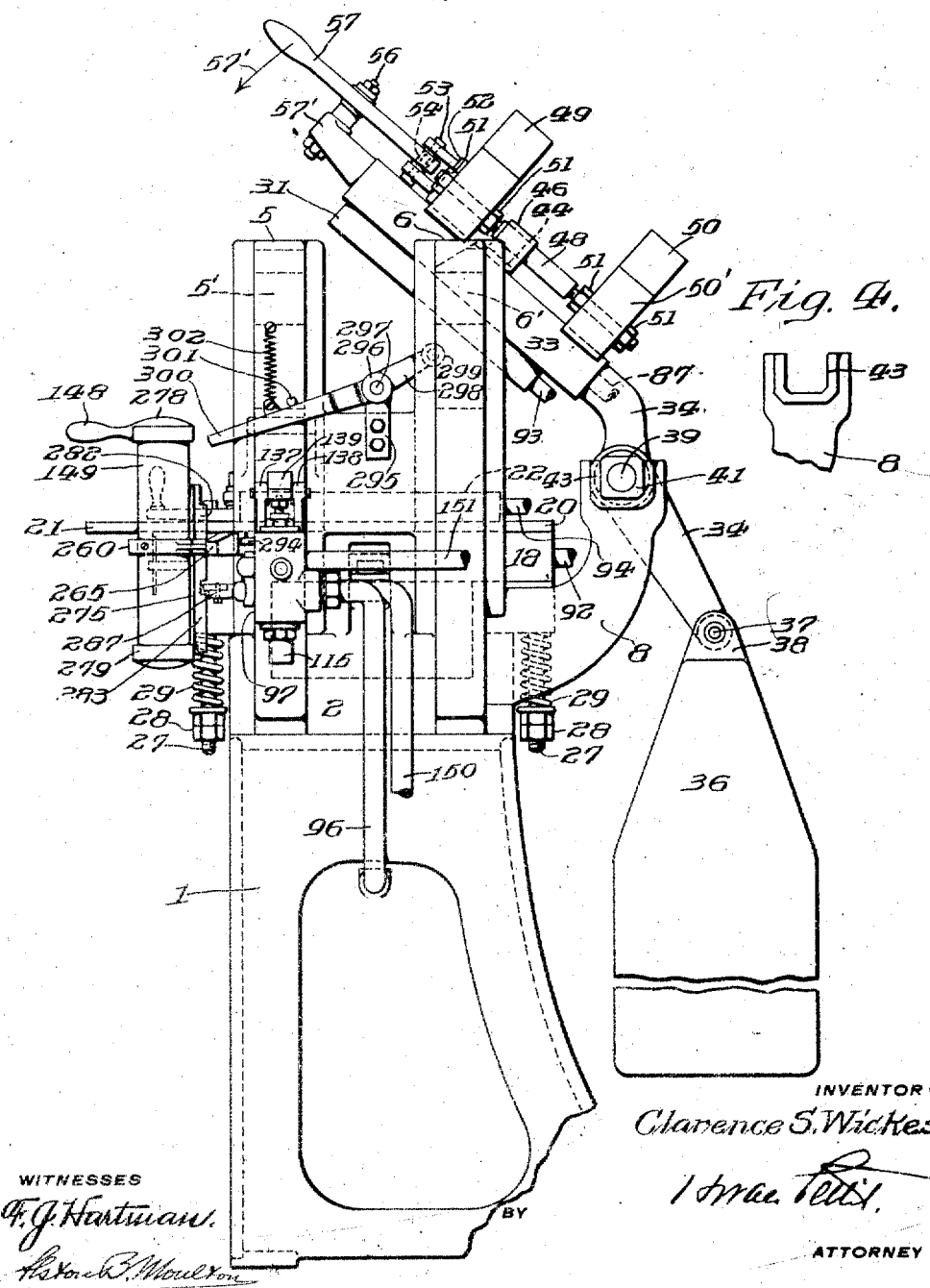

1,251,851.

Patented Jan. 1, 1918.
20 SHEETS—SHEET 4

WITNESSES

INVENTOR
Clarence S. Wickes

ATTORNEY

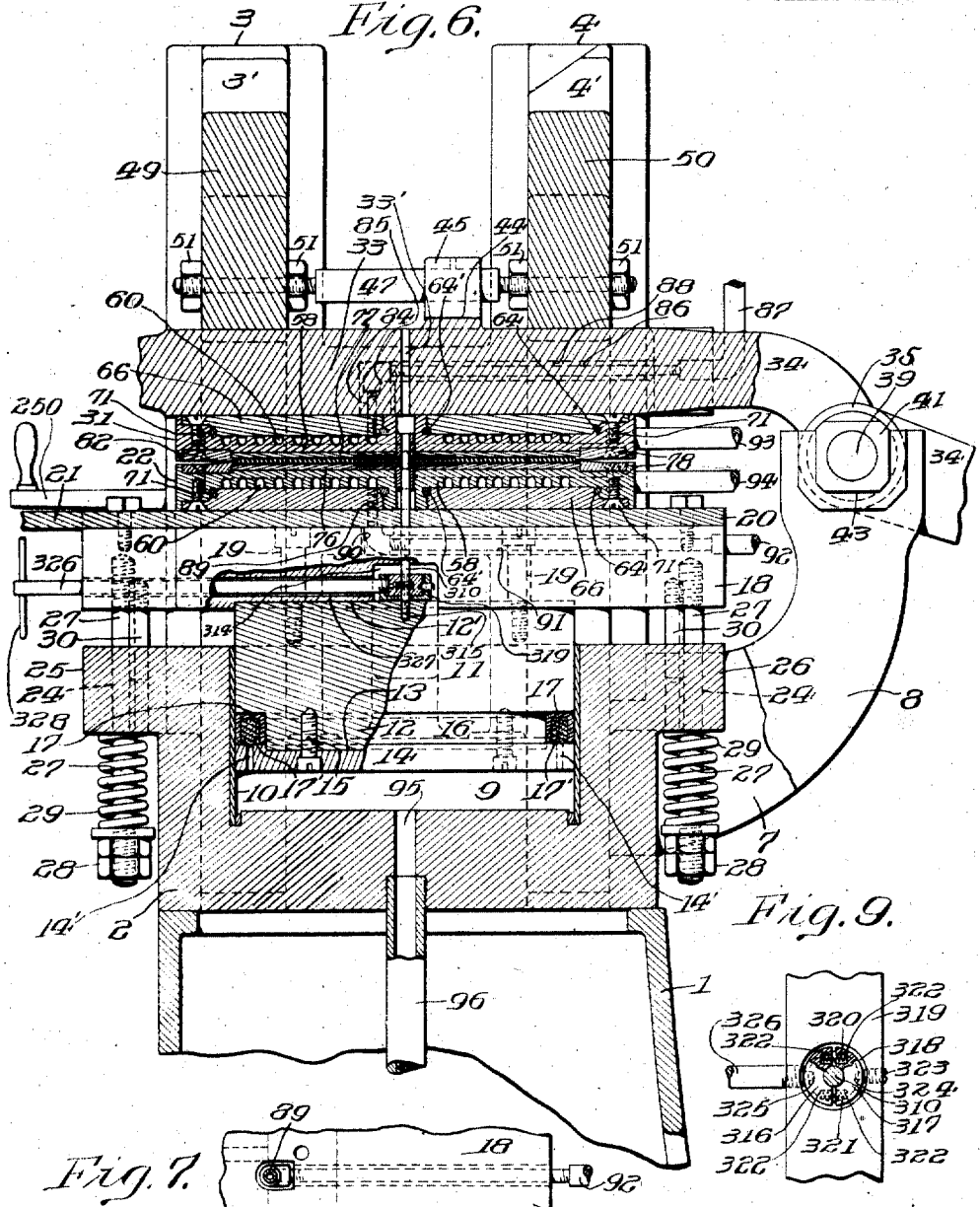

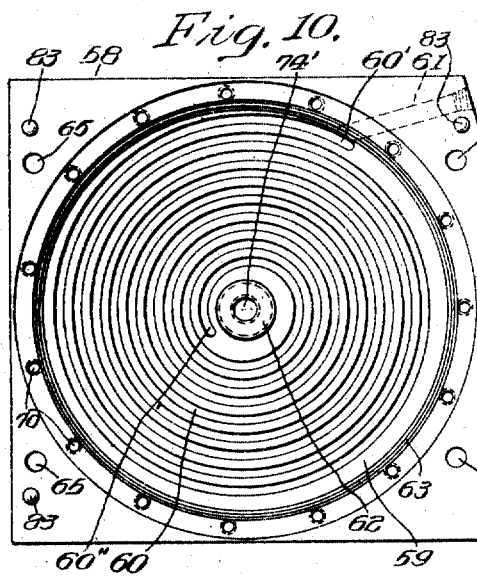
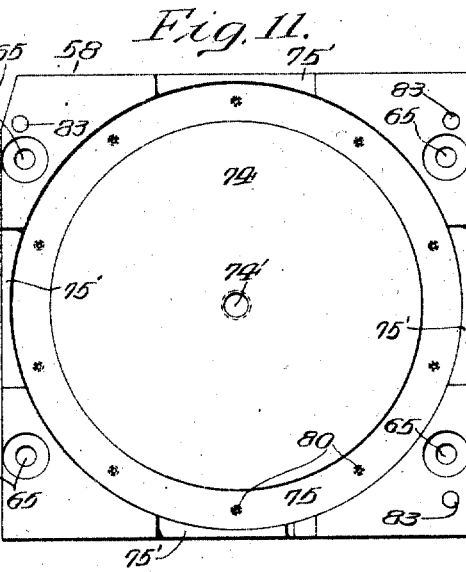
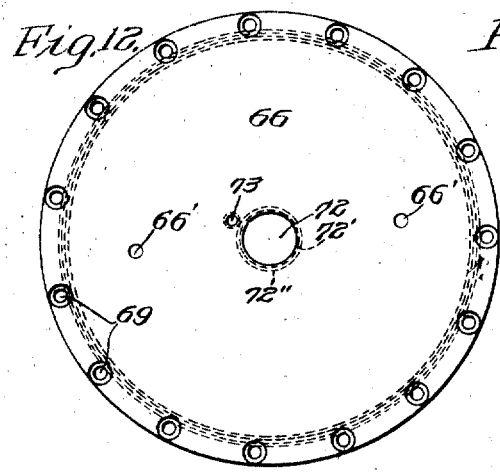
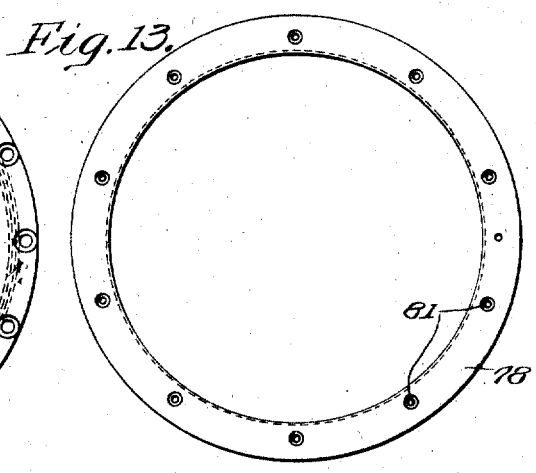

C. S. WICKES.
MOLDING PRESS.
APPLICATION FILED DEC. 11, 1913.
1,251,851. Patented Jan. 1, 1918.
20 SHEETS—SHEET 7.
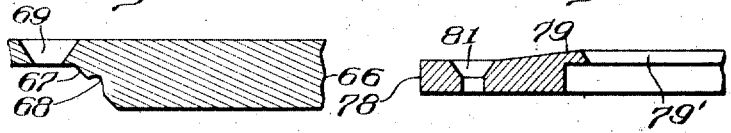
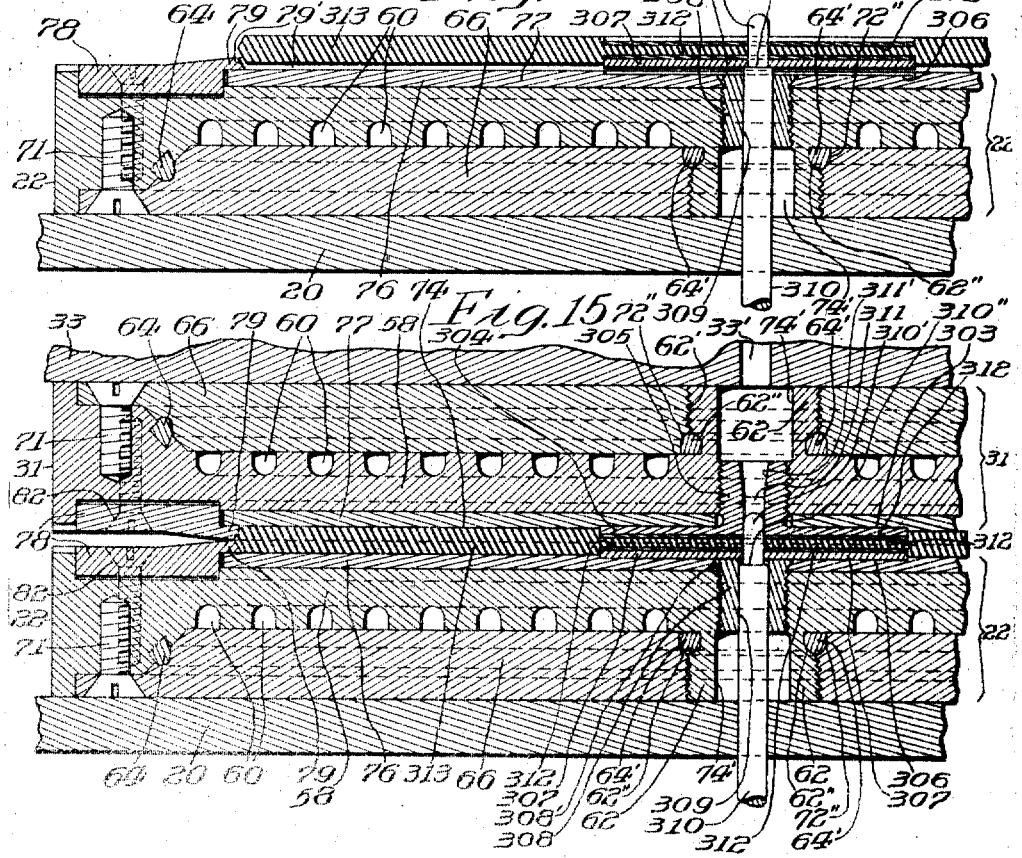
INVENTOR
Clarence S. Wickes.
WITNESSES
BY
ATTORNEY C. S. WICKES.
MOLDING PRESS.
APPLICATION FILED DEC. 11, 1913.
1,251,851.
Patented Jan. 1, 1918.
20 SHEETS—SHEET 8.
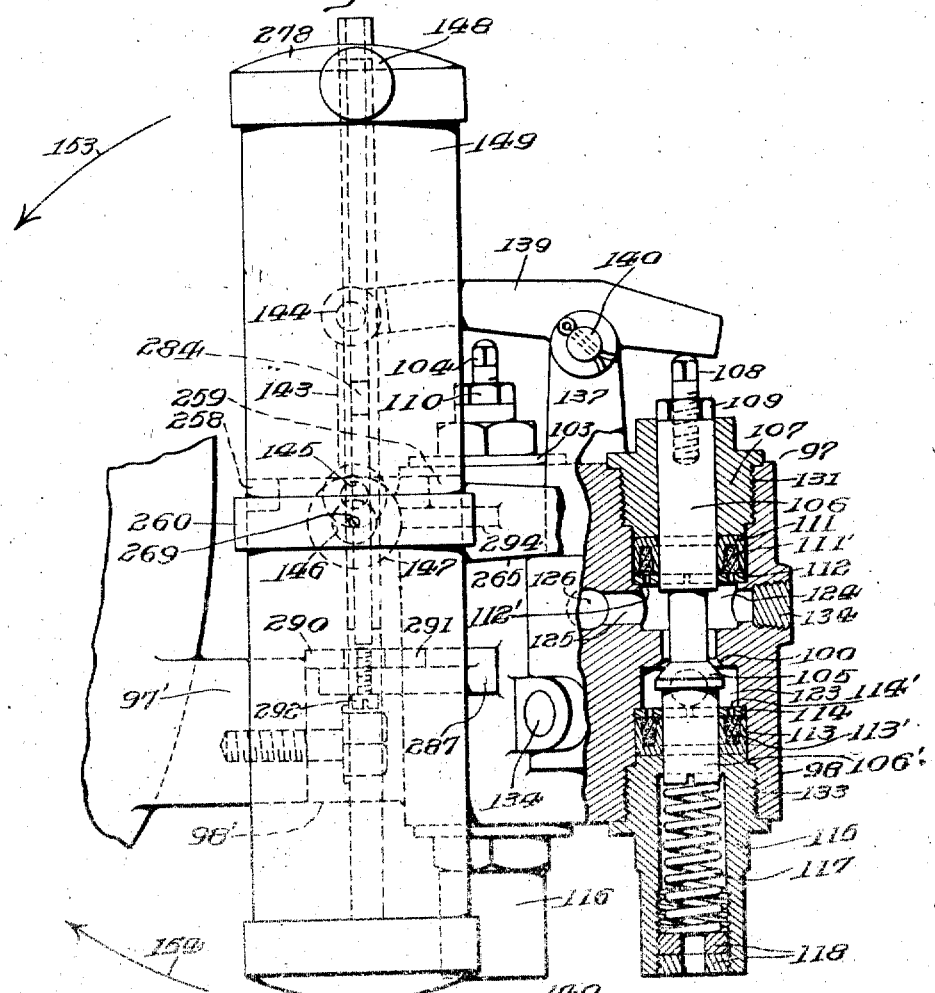
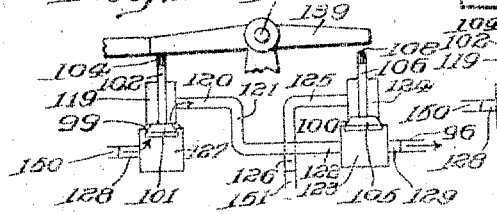
INVENTOR
Clarence S. Wickes.
BY
ATTORNEY

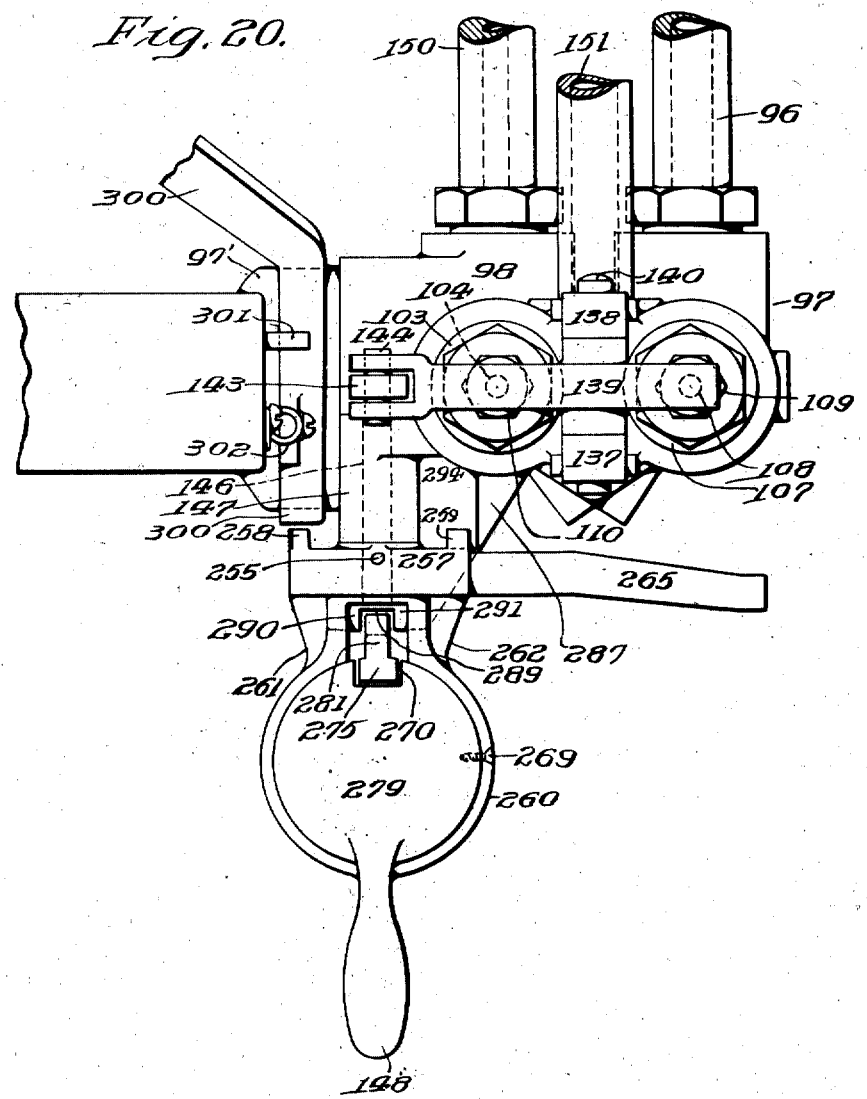

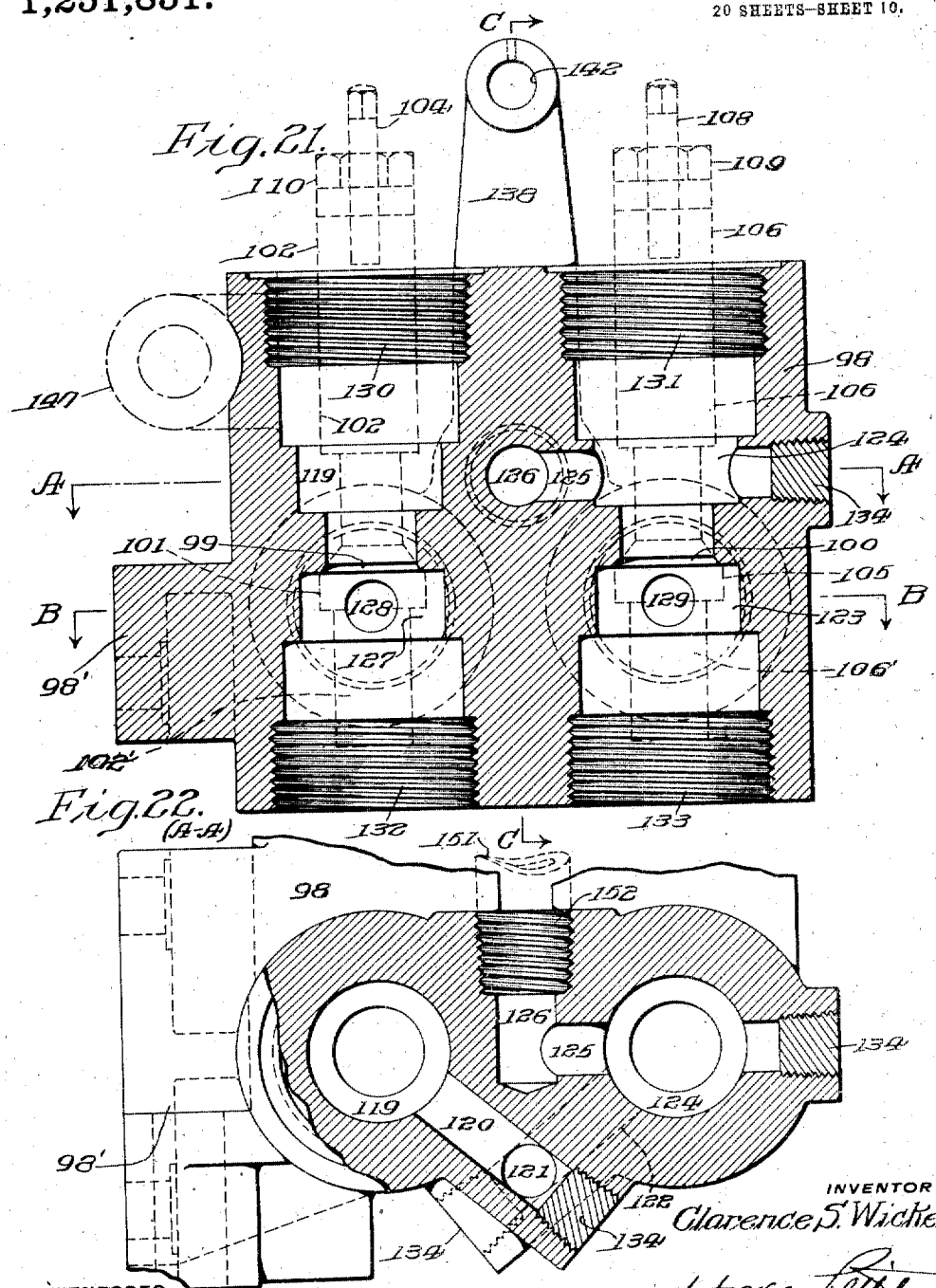

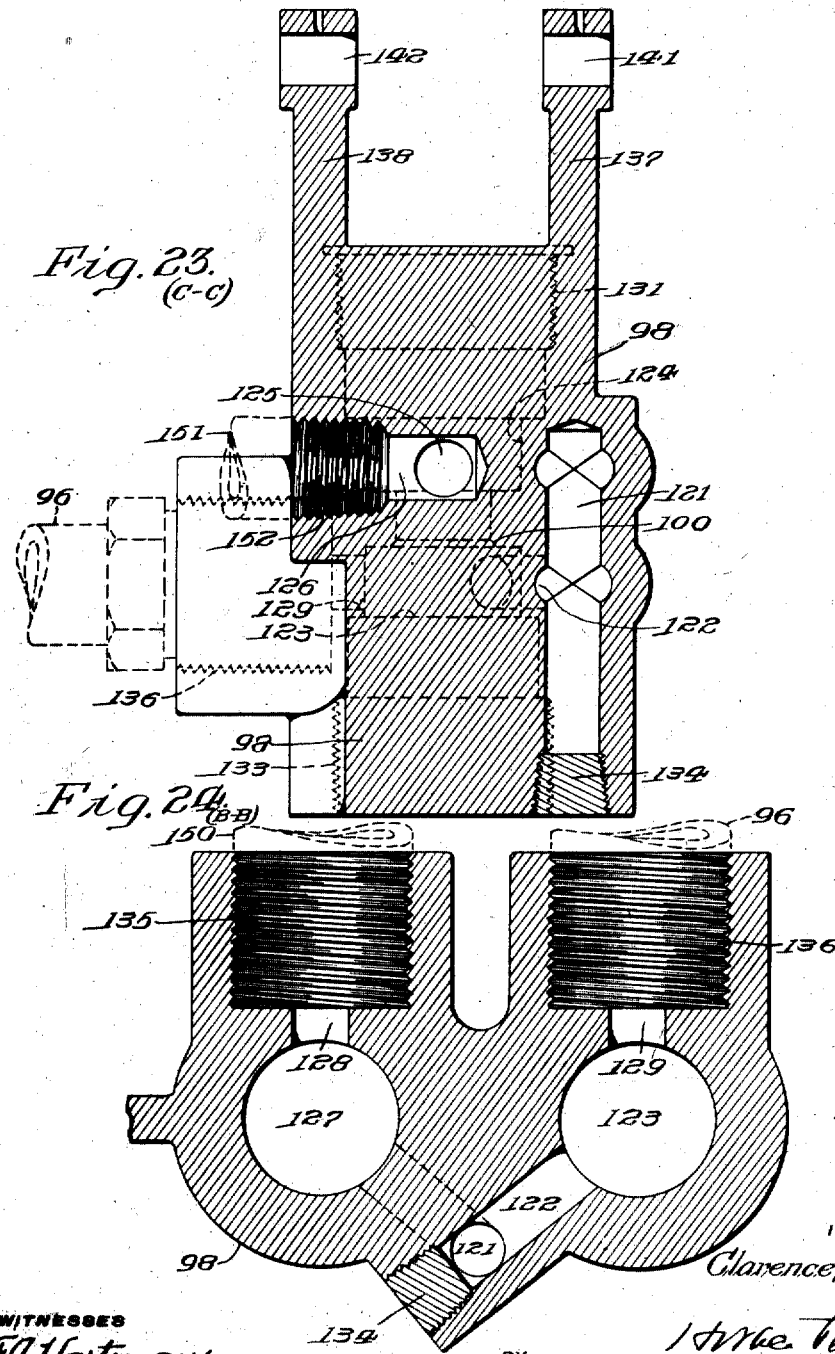

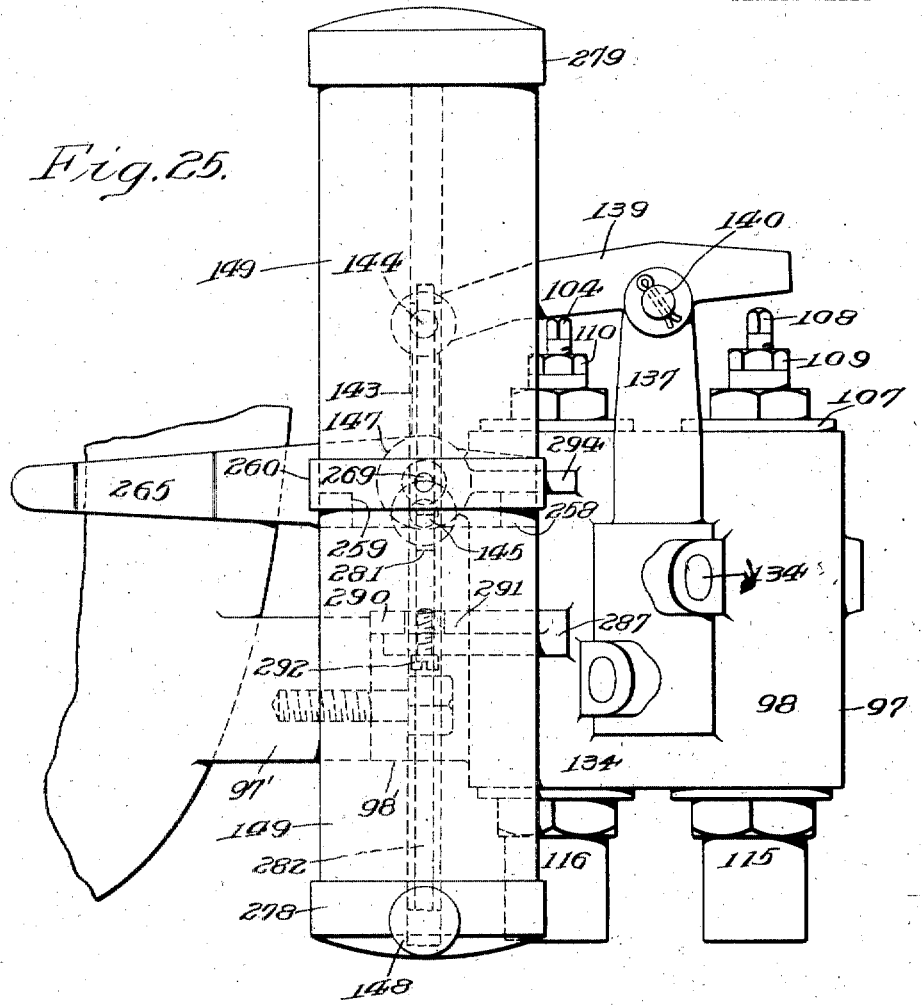

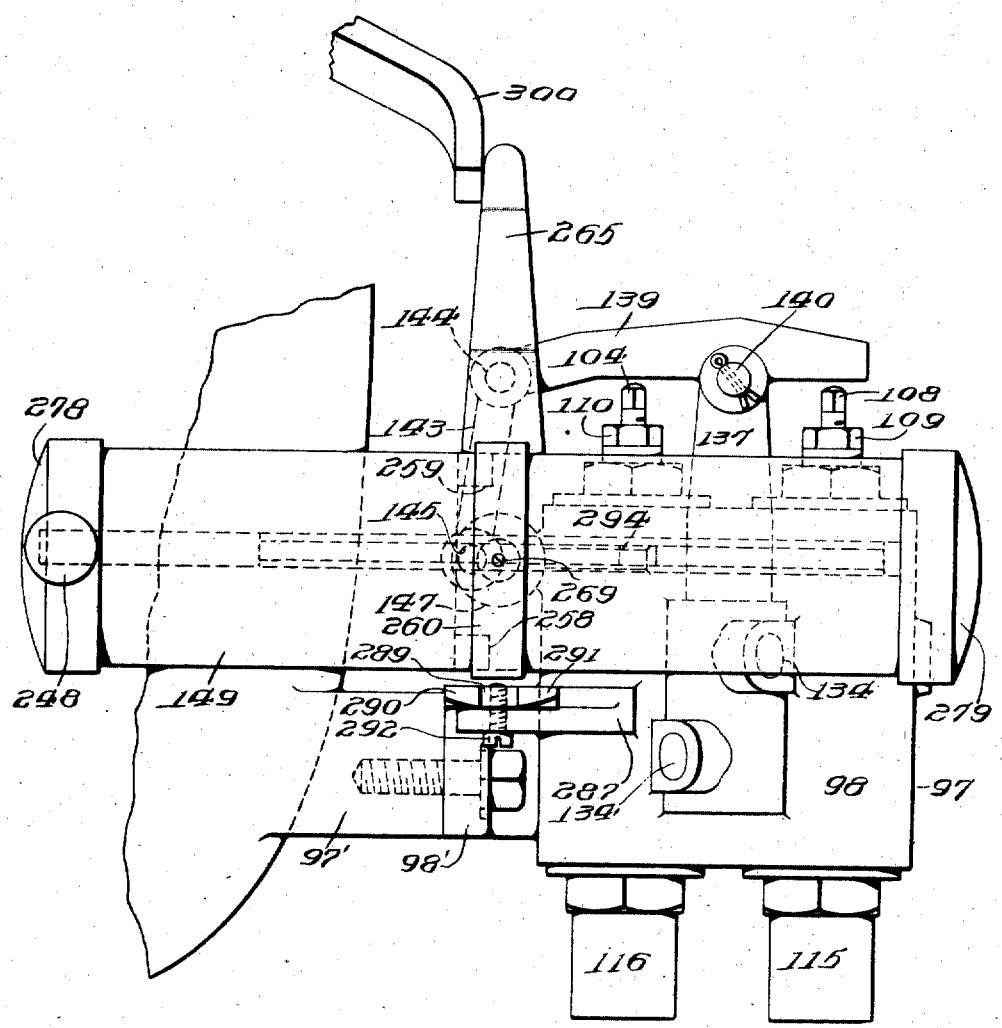

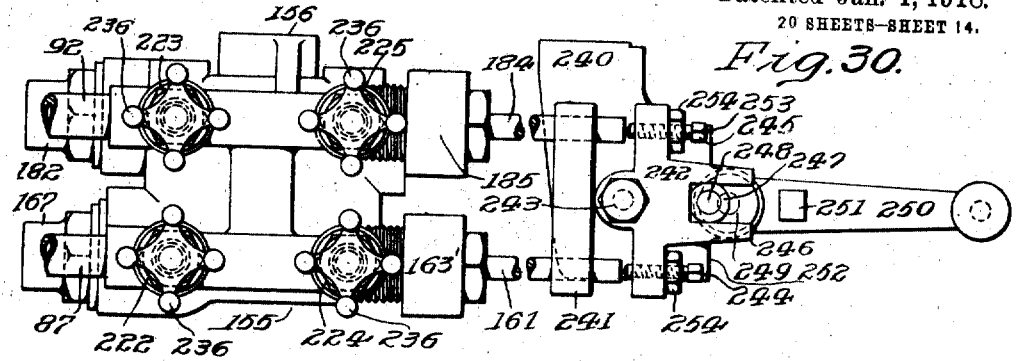
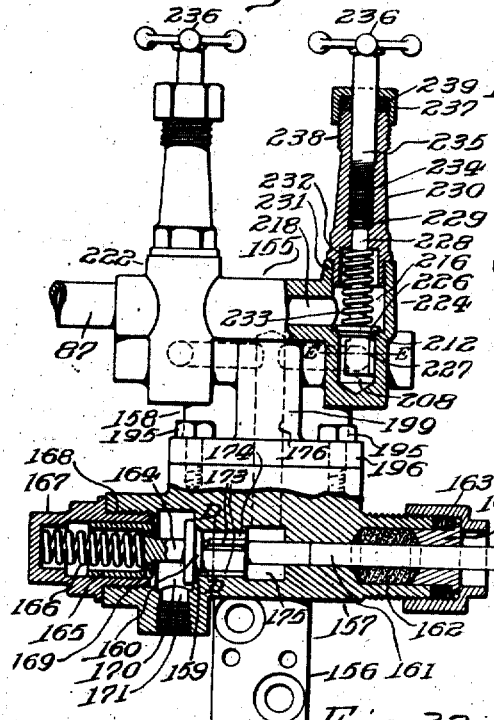
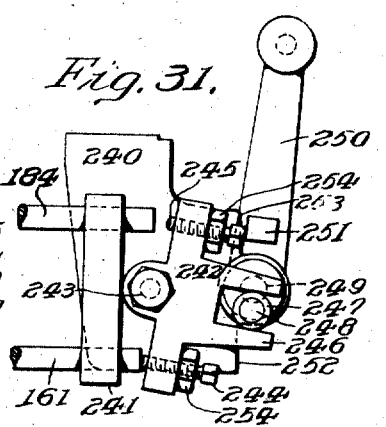
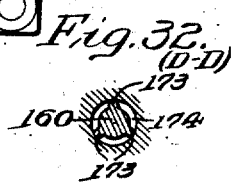

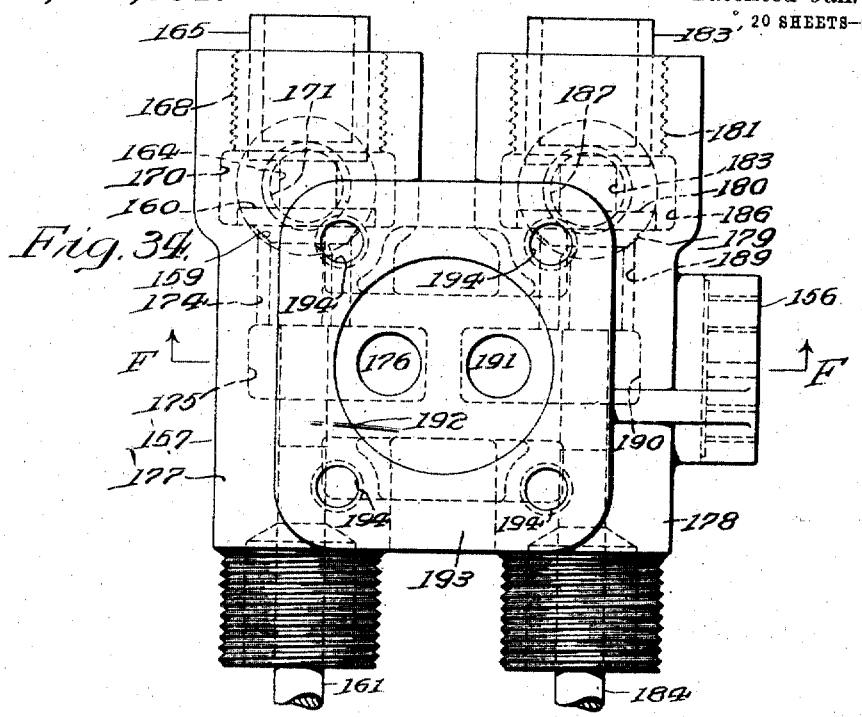
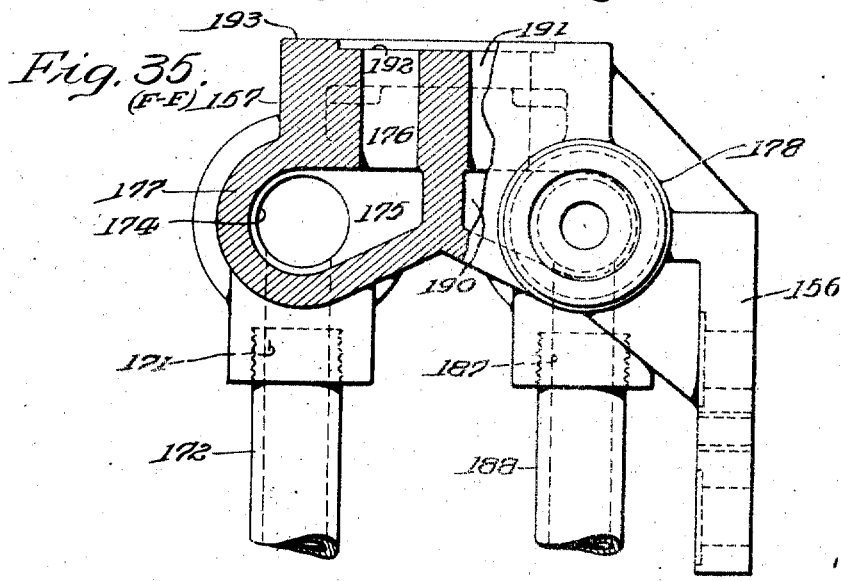

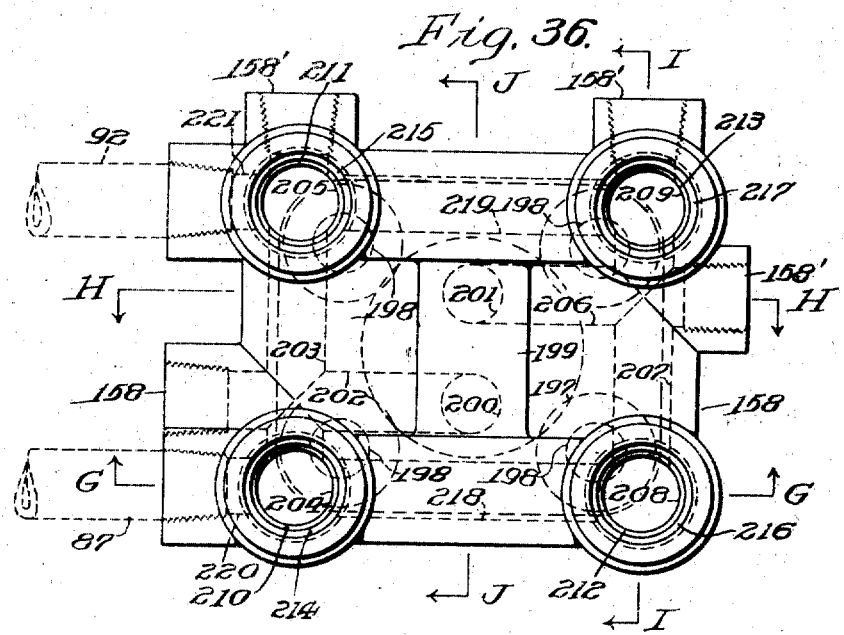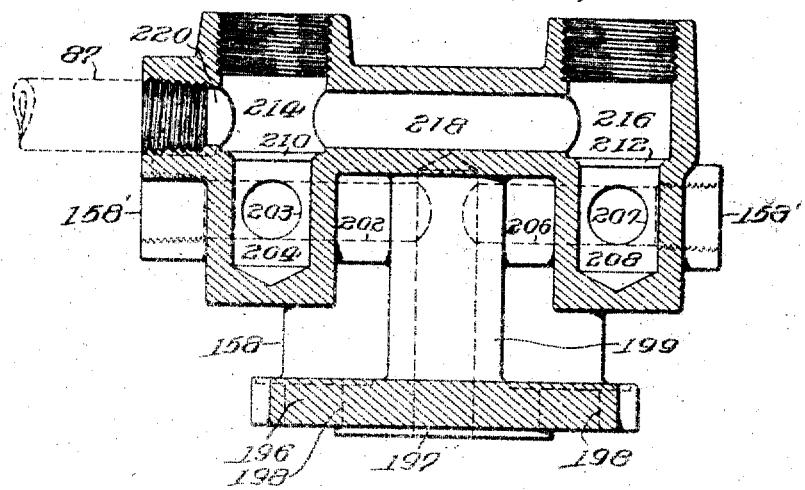

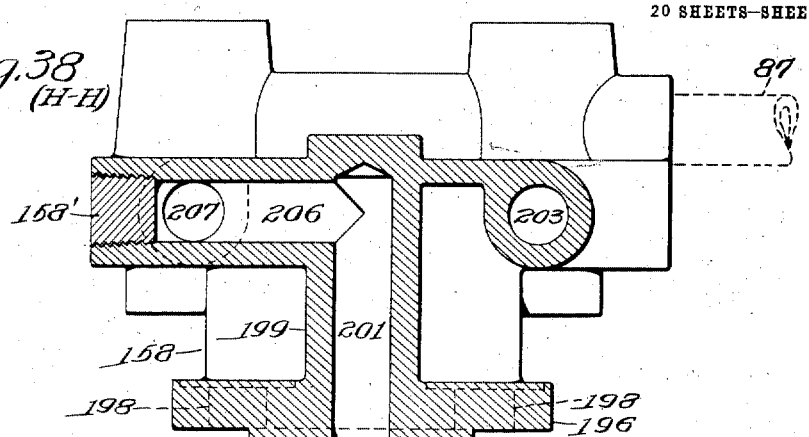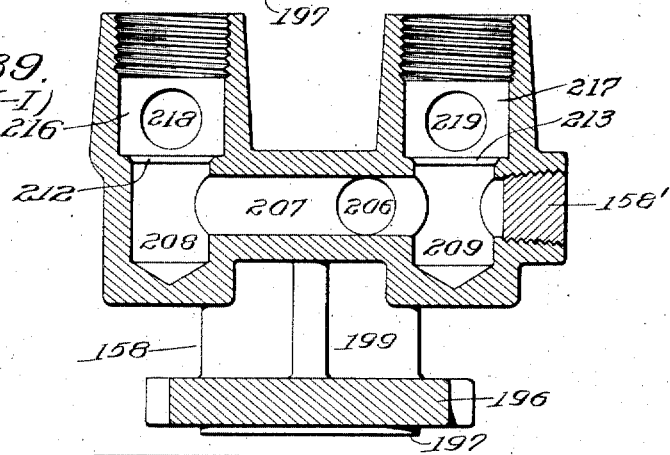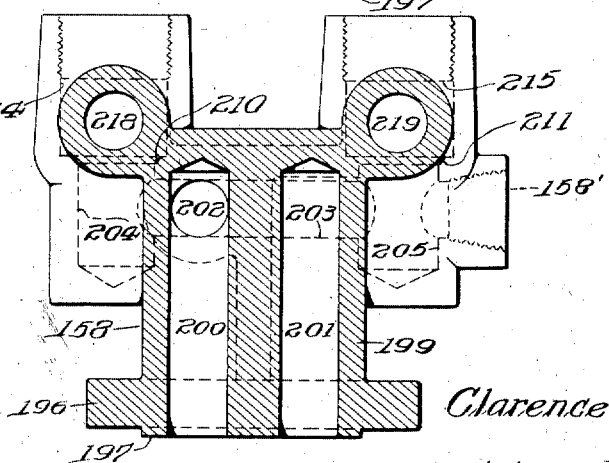

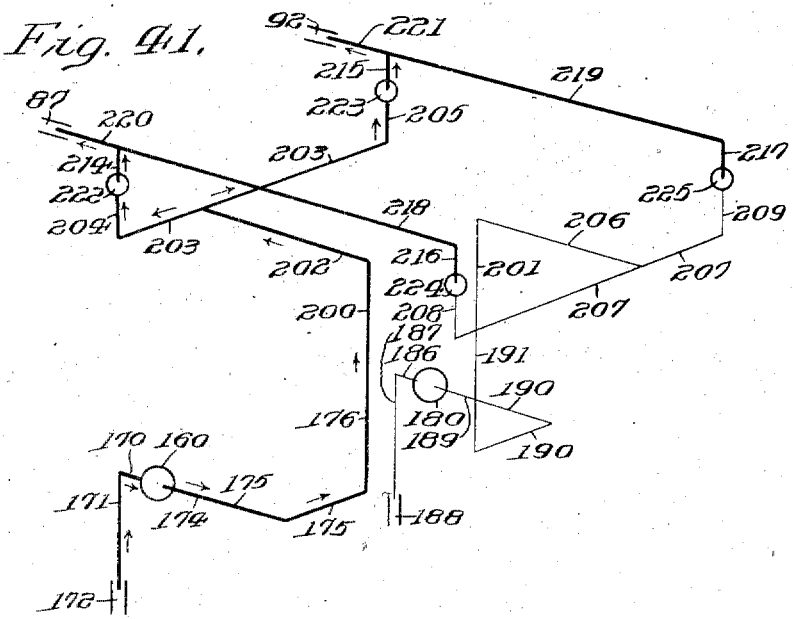
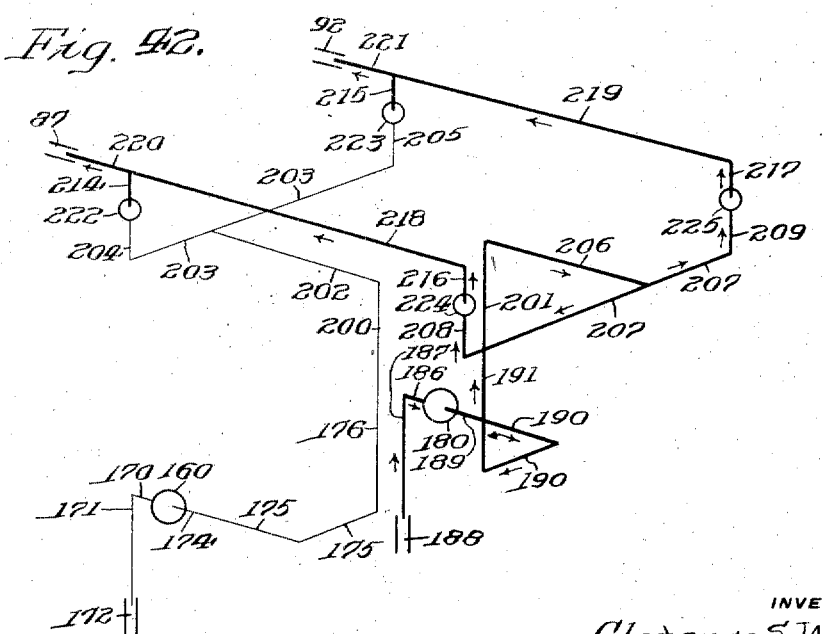

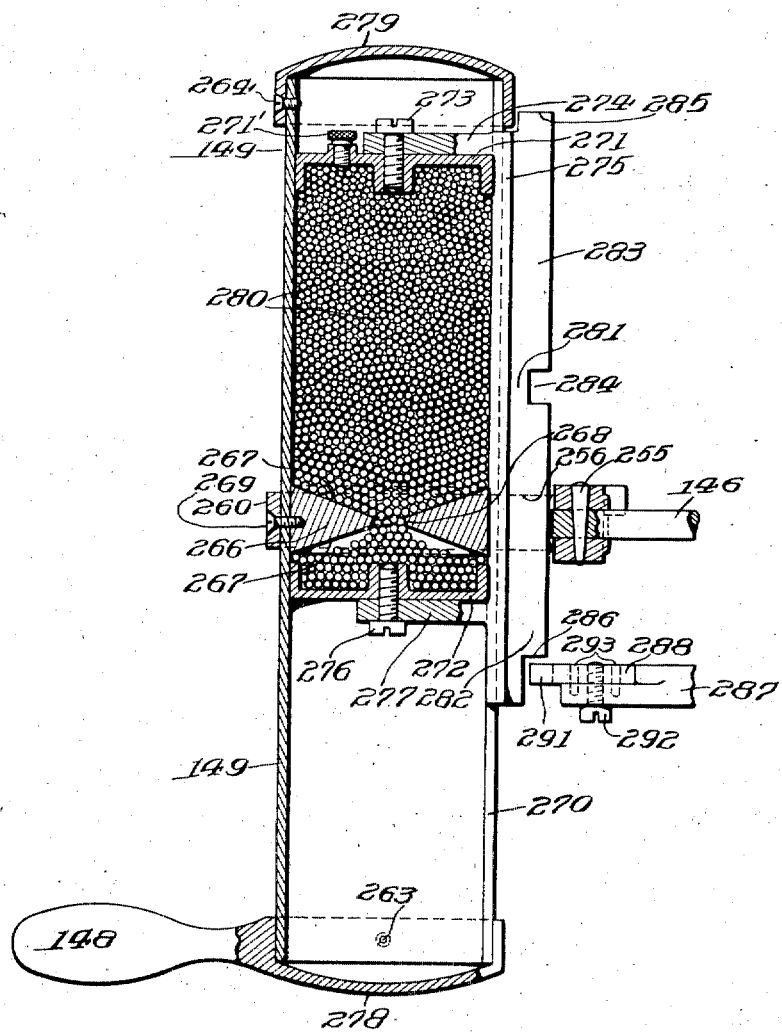

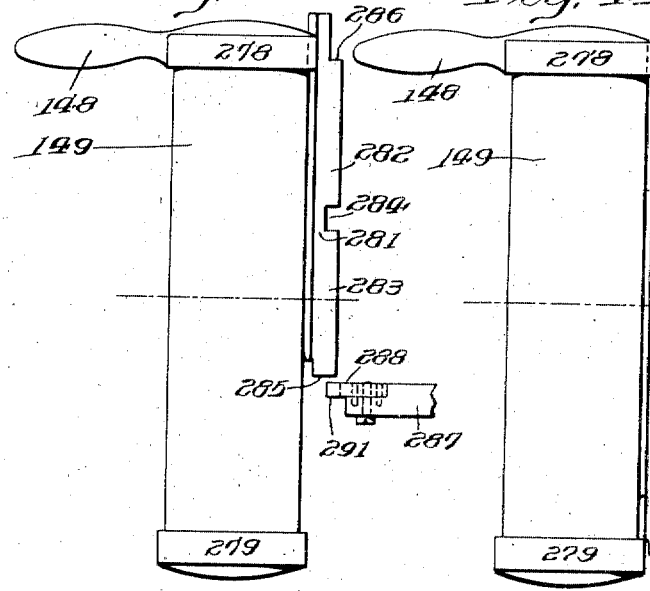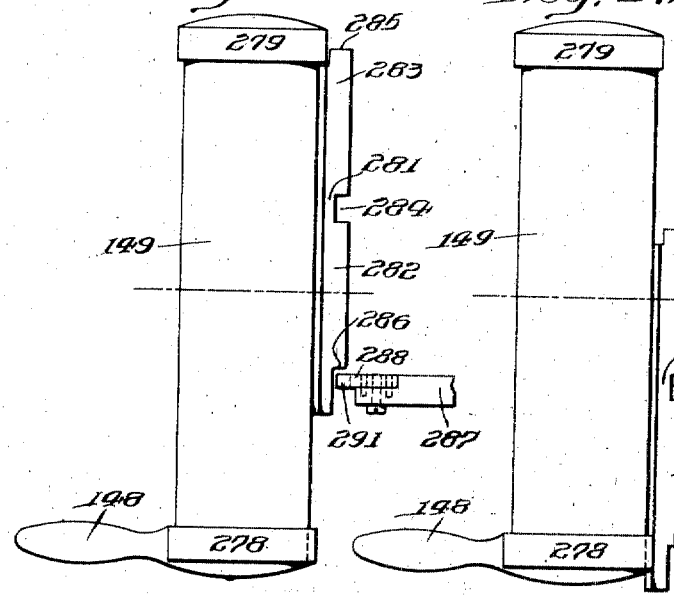

UNITED STATES PATENT OFFICE.

CLARENCE S. WICKES, OF MERCHANTVILLE BOROUGH, NEW JERSEY, ASSIGNOR TO VICTOR TALKING MACHINE COMPANY, A CORPORATION OF NEW JERSEY.

MOLDING-PRESS.

1,251,851.  Specification of Letters Patent.  Patented Jan. 1, 1918.

Application filed December 11, 1913. Serial No. 806,007.

*To all whom it may concern:*

Be it known that I, CLARENCE S. WICKES, a citizen of the United States, and a resident of the borough of Merchantville, county of Camden, and State of New Jersey, have invented certain new and useful Improvements in Molding-Presses, of which the following is a full, clear, and exact disclosure.

My invention relates both to the construction of presses for forming or shaping objects from a moldable substance, in such manner as to give a true and faithful replica in reverse of the die or dies between which the moldable material is given the desired form. More specifically, my invention relates to a mechanism particularly adapted for the production of sound record tablets, upon the surface of which is formed an undulatory groove corresponding to the recorded sound, said tablet when finished being suitable for use in reproducing sound by coöperating with the reproducing mechanism of a talking machine, or other similar sound reproducing mechanism.

My invention more specifically relates to the production of sound records of the disk or platen type, in one or both of the opposite plane surfaces of which is a sound record groove of the "gramophone" type; that is to say, a record in which the sound record groove is of substantially uniform depth, is generally spirally arranged upon the face of the tablet, and in which there are lateral undulations therein corresponding to sound vibrations, but my invention is not necessarily confined to the production of records of the "gramophone" type as those in which the records of sound are of the "hill-and-dale" type may be similarly produced in the mechanism forming the subject-matter of this application.

The objects of my invention are to produce a press or mold which is easily and quickly operated or manipulated; which is substantially uniform in its operation and in which the records produced thereby are similarly uniform; in which the alinement of the upper and lower platens and molds, or similar parts, is always uniform or identical or in which the platens and molds are always positioned in the same relation to each other, during the pressing operation; and which requires a minimum of care and attention on the part of the operator.

A further object of my invention is to produce a press in which a minimum amount of motion on the part of the operator or pressman, and also of the operating and operated parts of the mechanism, will be amply sufficient to permit of easy manipulation of the mechanism and of the production of a perfect impression from the matrix; such minimum amount of motion of the parts of the press, however, being amply sufficient to permit the insertion of the material into and between the molds of the press, and the removal of the finished product from the press, to be accomplished with facility and rapidity.

Further objects of my invention are to control or regulate the time at which various parts of the press may be operated; to automatically prevent the closing of the press until sufficient time has elapsed within which to properly heat the molds; to automatically prevent the opening of the press, or the separation of the platens thereof after the material has been placed therein and the pressure applied until sufficient time has elapsed within which the material may receive a perfect impression and then be cooled sufficiently to permit of its removal from the press without distortion; to automatically prevent the application of hydraulic or other similar pressure to the press until after a predetermined period of time has elapsed after the release of the said pressure thereto and conversely, to automatically prevent the removal or release of the said hydraulic or similar pressure to the press until after a predetermined period of time has elapsed after the application of said pressure thereto; to prevent the application of the pressure until the parts of the press are in position to mold the material placed within the same, with one platen locked with respect to the bed.

Further objects of my invention are to provide a simple, easily manipulated mechanism by means of which the upper and lower molds may be alternately heated and cooled; to provide a construction in which the platens are separable to an extent and movable to positions with respect to each other sufficient to make the inner or coöperating surfaces of the platens and molds of easy access for the purpose of cleaning the dies or matrices secured thereto, and to make the removal and substitution of dies and matrices an easily effected operation.

Other objects of my invention will appear in the specification and claims below.

Referring to the drawings forming a part of this specification and in which the same reference characters are used throughout the various views to designate the same parts, Figure 1 is a front elevational view of the complete press showing the upper and lower platens in their relative positions prior to the application of hydraulic pressure to the press; the hydraulic pressure controlling valve being shown mounted on the right hand side of the bed or body of the press, and the duplex valve and manifold for effecting and controlling the alternate heating and cooling of the molds, mounted on the left hand side of the bed or body of the press.

Fig. 2 is a plan view of the press shown in Fig. 1.

Fig. 3 is a side elevational view of the press with the upper platen and parts carried thereby swung to their upper positions, the hydraulic valve and timing device being shown in side elevation.

Fig. 4 is a view of a detail of construction of the press showing the upper end of one arm or bracket and the open seat for the reception of the journal boxes of the horizontal shaft upon which the upper platen is pivoted to swing.

Fig. 6 is an enlarged view, partly in section, showing the relative positions of the principal parts of the press proper, during the pressing of a sound record.

Fig. 7 is a fragmentary plan view of a portion of the lower platen, which is mounted upon the upper end of the piston, and shows the manner in which the heating and cooling fluids are conducted therethrough to the lower mold of the press.

Fig. 8 is a longitudinal sectional view of the detail of construction shown in Fig. 7.

Fig. 9 is a fragmentary detail plan view of the mechanism for clamping and holding the lower end of the center pin or spindle, for the purpose of automatically lifting a finished record up and out of the mold in which it was formed.

Fig. 10 is a plan view of one of the plates used in the upper and lower molds with the cover or cap removed.

Fig. 11 is a plan view of the opposite side of the plate shown in Fig. 10.

Fig. 12 is a plan view of the cap or closure which is fitted to that side of the plate shown in Fig. 10.

Fig. 13 is a plan view of the ring which is adapted to be attached to that side of the plate which is shown in Fig. 11, for securing a die or matrix to said plate.

Fig. 14 is a radial sectional view on an enlarged scale of a portion of the cap shown in Fig. 12.

Figure 5:
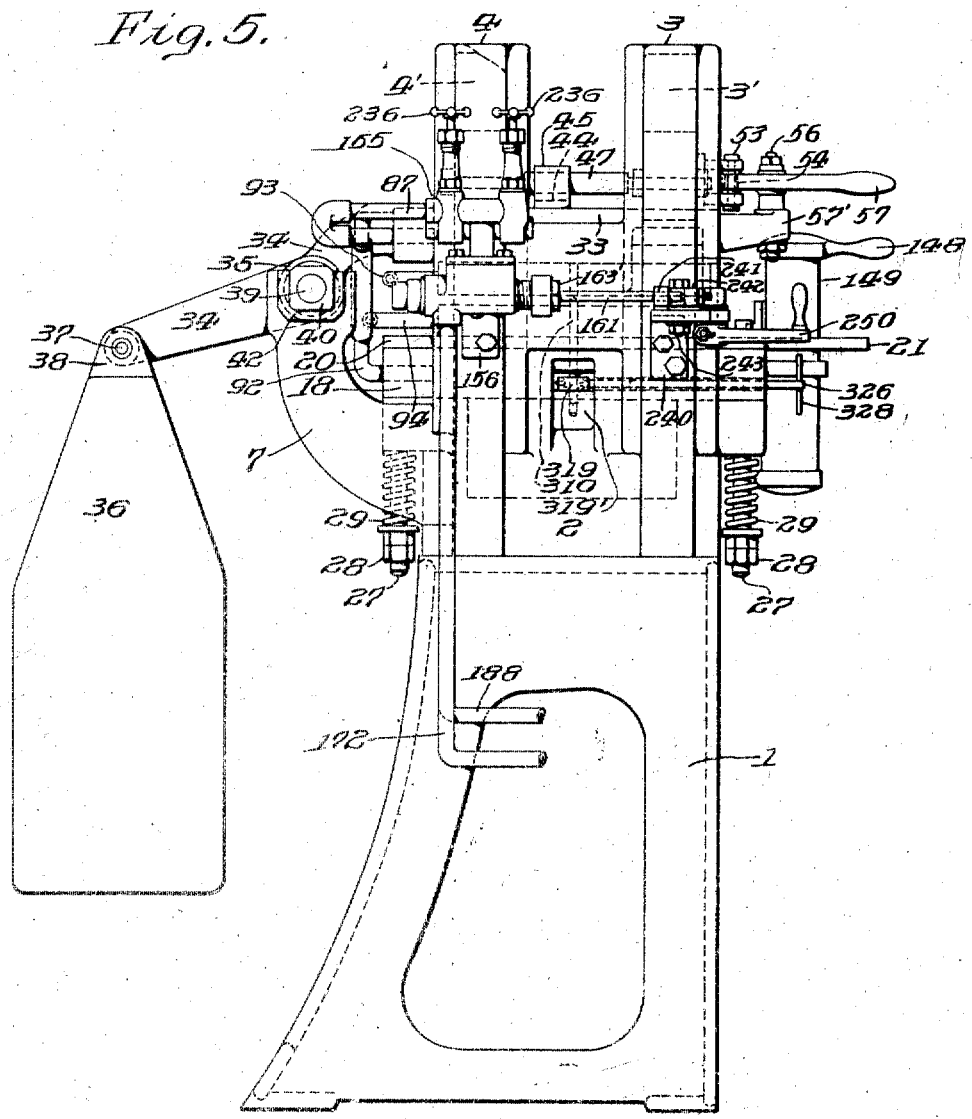
Fig. 5 is a side elevational view of the machine opposite to that shown in Fig. 3; and in this view, the duplex valve and manifold for effecting and controlling the alternate heating and cooling of the upper and lower molds is shown in side elevation in position on the frame or bed of the machine.

Fig. 14$^a$ is a similar fragmentary radial sectional view on an enlarged scale of a portion of the ring shown in Fig. 14.

Fig. 15 is a fragmentary sectional view, on a larger scale, of the platens with the molds therebetween, and showing a portion of a sound record tablet pressed between said molds.

Fig. 16 is a view similar to Fig. 15 of the lower mold, and a portion of the lifting mechanism whereby a record is lifted or ejected from the mold in which it has been formed.

Fig. 17 is a front elevational view of the timing mechanism and of a portion of the hydraulic valve for admitting water under high pressure into the cylinder of the press, and for allowing the water from the press to make its exit after the pressing operation, a portion of said valve being shown in section.

Fig. 18 is a diagrammatic view of the ports and passages in the hydraulic valve, the positions of the valves and direction of the flow of the fluid, when the same is being admitted under pressure into the cylinder to lift the plunger and press material between the platens.

Fig. 19 is a diagrammatic view similar to Fig. 18 but showing the valves in the position which they occupy and the direction of the flow of the fluid when the pressing operation is completed, and the fluid in the cylinder is being allowed to run to waste.

Fig. 20 is a plan view of the hydraulic valve and timing mechanism shown in Fig. 17.

Fig. 21 is a vertical sectional view through the valve chambers of the main casing or casting of the hydraulic valve, the valve members proper being indicated in dotted lines.

Fig. 22 is a transverse sectional view taken on the line A—A of Fig. 21.

Fig. 23 is a vertical sectional view taken on the line C—C of Fig. 21.

Fig. 24 is a transverse sectional view taken on the line B—B of Fig. 21.

Fig. 25 is a front elevational view of the hydraulic valve and of the timing mechanism, the latter with its parts being shown in a position occupied prior to the expiration of a predetermined length of time and as operating to prevent the handle from being raised to its uppermost position and thus preventing the closure of the hydraulic supply valve or the opening of the exhaust valve until the pressing of the record and the cooling of the molds may be properly effected.

Fig. 26 is a front elevational view of a detail of construction whereby the operator is prevented from admitting water, under high pressure, to the hydraulic cylinder, while the press is open, or while the upper platen is not locked to the bed or frame of the press.

Fig. 27 is a side elevational view of the detail shown in Fig. 26.

Fig. 28 is a front elevational view of the hydraulic valve and timing device and the means for preventing the application of fluid pressure to the cylinder when the leaf or upper platen is not locked rigid with respect to the bed.

Fig. 29 is a side elevational view, partly in section, of the duplex valve and manifold by means of which the flow of the heating and cooling fluids to the upper and lower molds is regulated and controlled.

Fig. 30 is a plan view of the duplex valve and manifold shown in Fig. 29.

Fig. 31 is a fragmentary plan view of the mechanism for opening the duplex valve showing the operating lever in the position of admitting a heating fluid to the molds.

Fig. 32 is a fragmentary sectional view taken on the lines D—D of Fig. 29.

Fig. 33 is a fragmentary sectional view on the line E—E of Fig. 29.

Fig. 34 is a plan view of the lower casting forming the casing of the duplex valve, and also indicating, in dotted lines, the valve members therein.

Fig. 35 is a partial sectional view taken on the line F—F of Fig. 34.

Fig. 36 is a plan view of the casting forming the casing of the manifold.

Fig. 37 is a sectional view taken on the line G—G of Fig. 36.

Fig. 38 is a sectional view taken on the line H—H of Fig. 36.

Fig. 39 is a sectional view taken on the line I—I of Fig. 36.

Fig. 40 is a sectional view taken on the line J—J of Fig. 36.

Fig. 41 is a diagrammatic view showing in perspective, the relative arrangement and direction of the ports and passages in the duplex valve and manifold, the heavy lines indicating the passages for steam or other heating fluid therethrough, and the lighter lines indicating the passages for water, or other cooling fluids which are closed by the check valves of the manifold.

Fig. 42 is a view similar to Fig. 41, the heavy line showing the passages for water or cooling fluid through the duplex valve and manifold, and the lighter lines indicate the passages which are closed by the check valves of the manifold.

Fig. 43 is a vertical sectional view through the timing mechanism or timer.

Figs. 44 to 47 inclusive show the different positions of parts of the timing mechanism or timer at different times or periods during the operation thereof.

The general construction of the press and the relation of the parts thereto may be had perhaps most readily by a consideration of Figs. 1 to 6 of the drawings, particular reference to which will first be made.

Upon a suitable base or support 1 is mounted the operative parts of the press, the same consisting of a substantially rectangular bed or body 2 having arranged at the four corners thereof upwardly extending posts or arms 3, 4, 5 and 6 preferably integral with the bed or body portion 2. The bed 2 and posts or arms 3, 4, 5 and 6 are preferably made of a one-piece steel casting of relatively heavy construction. The upper ends of the posts or arms 3, 4, 5 and 6 are provided with overhanging locking lugs 3', 4', 5' and 6', extending inward toward the middle vertical plane of the press, and under surfaces of said lugs are preferably arranged in a horizontal plane. Extending rearwardly and upwardly from the back of the bed or body 2 are two brackets 7 and 8, the top ends of which are arranged to receive journal boxes which will be later referred to.

The bed or body is preferably provided with a cylindrical recess extending substantially centrally downwardly from the top surface thereof and forming a cylinder 9, and this cylinder is preferably lined with a copper bushing 10, and within it there is fitted a piston or plunger 11. The lower end 12 of the plunger 11 is preferably reduced in diameter and is fitted into a circular recess 13 in an extension or head 14, which head is of the same diameter as the plunger 11 and the interior of the cylinder 9. The said extension or head 14 is preferably attached to the end of the plunger by screws 15. A groove or channel 16 is thus formed between the piston 11 and the head 14 for the reception of suitable packing. This packing preferably consists of a ring 17 of flexible material such as leather, U-shaped in cross section, the open side of the said ring extending toward and being in engagement with the said head 14. The interior of said ring 17 is preferably packed tightly with hemp packing 17'. The head 14 is also preferably provided with a series of openings 14' extending therethrough and communicating with the interior of said leather washer 17 and with the packing 17' contained therein. When the packing is so placed in the groove 16 and high hydraulic pressure is admitted into the cylinder, some of the water under pressure will pass through the openings 14' and will act to expand the packing and to force the outer side of the leather ring 17 firmly against the interior of the cylinder. In this way a watertight fit between the packing ring 17 and the interior of the cylinder may be effected.

The upper end of the piston 11 is fitted within a shallow recess 12' in the lower side of the lower platen 18 and is rigidly secured to said platen in any suitable manner, as by bolts or screws 19. On the upper face of the platen 18 is secured the bolster plate 20 which substantially fills the space above the platen between the upwardly extending posts or arms 3, 4, 5 and 6, and the front end of the same extending outwardly from the machine forms a relatively small shelf or table 21.

It is to this bolster plate 20 that the lower mold 22 is secured by screws or bolts 23. The details of the construction of the lower mold 22 will be described below.

Extending from the underside of the lower platen 18 and through suitable openings 24 in the flange 25 on the front of the bed or body 2, and the flange 26 on the rear of the bed or body 2 are vertically arranged bolts 27 threaded at their lower ends and provided with suitable locking nuts 28. Surrounding the lower ends of the said bolts and between the nuts 28 and the under side of the flanges 25 and 26 respectively, are coiled springs 29, the tension of which is arranged to tend to draw the piston or plunger 11 and the parts attached thereto downwardly to their lowermost positions with respect to said bed or body 2. Also depending downwardly from the under side of the lower platen 18 are dowel or positioning pins 30 each sliding into an alined hole in the top of the bed plate to prevent any rotative movement of the piston and the parts attached thereto with respect to the bed.

The upper mold 31 is secured in any suitable manner, as by screws 32, (see Fig. 1) to the lower face of the leaf or upper platen 33, from the rear side of which extends an arm 34 providing oppositely extending sleeves or hubs 35 arranged at right angles to the longitudinal axis of said arm 34. The outer or rear end of the arm 34 is provided with a bearing 34' from which is suspended a counterweight 36 on the bolt 37 extending through said bearing 34' and through suitable lugs 38 on said counterweight 36.

Said transversely extending bearing sleeves or hubs 35 are mounted on a shaft 39 extending beyond the ends of said hubs 35 and journaled in suitable journal boxes 40 and 41, which rest in open seats 42 and 43 on the upper ends of the brackets 7 and 8 respectively.

The counterweight 36 is of such a size as will substantially counterbalance the combined weight of the leaf or upper platen 33, the upper mold 31, and the other parts attached to and carried by the leaf or platen 33, and the counterweight 36 hangs freely from its pivot pin or bolt 37, in order to regulate the position of the center of gravity. The axis of the shaft 39 is substantially in the plane of the lower surface of the top mold 31.

On the upper side of the upper platen or leaf 33 is a transverse rib 44 at the ends of which are upwardly extending lugs 45 and 46 through which guide and connecting rods 47 and 48 are longitudinally slidable. The ends of these guides and connecting rods 47 and 48 pass through transversely arranged locking bars 49 and 50, which rest upon and are substantially supported by the upper platen or leaf 33. The outer ends of the locking bars 49 and 50 preferably slightly overhang and fit against the opposite smooth sides of the upper platen or leaf 33. The opposite ends of each of the guide and connecting rods 47 and 48 are screw threaded and are rigidly secured to the locking bars 49 and 50 by nuts 51 arranged on opposite sides of each locking bar.

Extending from the middle of the front of the locking bar 49 is a bracket 52 within which is a vertically arranged pin 53 carrying an anti-friction roller 54 which fits into a cam slot 55 eccentrically arranged with respect to the pivot pin 56 of a locking lever 57 provided with a handle 57'. The pivot pin or bolt 56 is rigidly secured to and extends upwardly from a bracket 57' extending forwardly from the middle of the leaf 33.

By this construction a reciprocatory motion forwardly or rearwardly may be imparted to the locking bars 49 and 50 by grasping the handle 57" and swinging the lever 57 about its pivot 56. When the lever 57 is in the position shown in Fig. 2, the outer ends of the locking bar 49 will be under and in engagement with the overhanging locking lugs 3' and 5' of the posts or arms 3 and 5, and the outer end of the locking bar 50 will be under and in engagement with the lugs 4' and 6' of the posts or arms 4 and 6. By swinging the lever 57 on its pivot 56 to its other extreme position, the locking bars 49 and 50 will be moved rearwardly of the press to a position out from under said locking lugs 3', 4', 5' and 6'. Such a position of the locking bars 49 and 50 with respect to the leaf is indicated in Fig. 3, and when said bars are in said position, the leaf 33 may be swung upwardly about the shaft 39 as an axis to the position shown in said Fig. 3, to give access to the space between the platens for the insertion of material to be pressed, or for the purpose of cleaning or substituting different dies or matrices. The swinging of the leaf upwardly is effected by lifting on the handle 57' of the lever 57. The lever 57 is then for the two-fold purpose of moving the locking bars 49 and 50 into and out of locking position with respect to the locking lugs 3', 4', 5' and 6', and of raising and lowering the leaf 33, about the shaft 39 as an axis. It is also to be observed that when the locking bars 49 and 50 are moved forwardly and rearwardly as above described, they ride or slide on the smooth top surface of the leaf or upper platen 33 and any tendency of said locking bars to move longitudinally is prevented by the ends of said bars which overhang and engage against the smooth sides or edges of the upper platen.

The particular embodiment of my invention, illustrated in the drawings of this application, is for forming what are known as double-faced sound records, that is to say, sound records in which sound record grooves are formed in the two opposite sides of the record disk, and therefore the lower and upper platens 18 and 33 of the press are respectively provided with molds 22 and 31, said molds being substantially identical in construction. Referring, therefore, now particularly to Figs. 6, 15 and 16, in which the two said molds are shown in cross section in the press, and to Figs. 10, 11, 12, 13, 14 and 14ª, in which are illustrated details of the construction of one of the molds, each mold consists of a plate 58 substantially square in its outer contour, in one face of which, as shown in Fig. 10, is a circular recess 59 the bottom of which is provided with a continuous spiral groove 60 beginning at the point 60', where the groove communicates with the port or passage 61, to a point 60'', near the circular projection 62 of the center of said recess. The top surface of said circular projection 62 is in the plane of the top surface of the plate 58 and its exterior surface is provided with screw threads 62'. The outer wall 59' of the recess 59 is beveled, and is provided with a groove 63, the side walls of which are undercut, and in said groove 63 is seated a packing ring 64 of lead or other soft metal, or of any other suitable packing material, (see Figs. 15 and 16). Each plate 58 is preferably provided with four openings or holes 65, through which may pass the screws 23 (see Fig. 1) when the plate is to be used for the bottom mold of the press, or the screws 32 (see Fig. 1) when the plate is to constitute the top mold. Fitted over and extending into the recess 59 in the plate 58 is a cap 66, particularly shown in Figs. 12, 14, 15 and 16, said cap being preferably circular in shape and having a beveled portion 67 fitting against the outer beveled edge 59' of the recess 59. The beveled portion 67 of said cap 66 is also provided with a circular groove 68 preferably substantially semicircular in cross section, into which the lead or other packing 64 is arranged to fit. Adjacent the edge of the cap 66 are a plurality of holes 69 registering with threaded holes 70 in the plate 58. Screws 71, (see Fig. 15), extending through said holes 69 in the cap and into the holes 70 of the plate 58, serve to secure the cap rigidly to the plate 58 with the packing ring 64 tightly fitting into the grooves 63 and 68. The cap 66 is provided with a concentric hole 72 provided with interior screw threads 72' to cooperate with the threads 62' of the circular projection 62, and the cap 66 is secured to the plate by screwing the cap 66 over and around the projection 62 and down on the plate 58, until the inner side of the cap 66 firmly rests upon substantially the entire surface of the recess 59 of the said plate 58. The circular projection 62 of the plate 58 is preferably provided with a beveled annular groove 62'', (see Fig. 16), while the inner side of the cap 66 surrounding the opening 72 is provided with a similar beveled groove 72'' for the reception of a packing ring 64', the material of which is preferably similar to that of the packing ring 64. When the cap is screwed firmly down into the recess 59 of the plate 58, said packing rings 64 and 64' will slightly spread and fill the grooves or channels in which they are located, and form an absolutely steam tight joint between the plate 58 and the cap 66. It is to be observed that the mold assembled as above described, is provided with a continuous spiral channel or groove 60 extending from the point 60' at substantially the outer or larger diameter of the recess 59 to a point 60'' near the center of the said recess. In the cap 66 is an opening 73 which, when the cap 66 is secured to the plate 58, is in registration with the said inner end 60'' of the said groove. Said opening 73 is preferably tapped or screw-threaded in order that a pipe may be secured thereto, as will be described below.

The opposite side of the plate 58 is also recessed, as shown in Figs. 11, 15 and 16, to form a flat surface 74 below the plane of the side of the plate 58 in which the same is located, and an annular channel 75 slightly below the plane of the surface 74. Said surface 74 is circular and of substantially the size and shape of the die or matrix from which a record is to be pressed. At a point in the middle of the said depression 74, a hole 74' provided with screw threads is formed, said hole extending through the plate 58 concentrically of the circular projection 62 thereof. As shown most clearly in Figs. 6 and 15, when the plate is to be used for the lower mold, the matrix 76 is seated on the surface 74. When the plate is to be used as the upper mold, the matrix 77 is seated on the surface 74. To hold a matrix on said surface 74, a ring 78 (shown in Figs. 14, 14ª and 15) is seated in the channel 75 and secured to the plate 58, said ring being provided with a ledge or shoulder 79, which overhangs the inner edge of the channel 75 and the outer surface of the die or matrix. When the double faced sound records are to be pressed, or molded, the inner edge 79' of the overhanging flange 79 of the ring is made of substantially one half the width of the thickness of a sound record tablet, and is slightly beveled as shown in Fig. 14ª. When single faced sound records are produced in the mechanism, the edge 79' will be substantially as wide as the thickness of a sound record tablet and will be similarly beveled to allow for the ready removal of the pressed record from the surface of the matrix. The plate 58 is provided with tapped holes 80 registering with holes 81 in the ring 78. Suitable screws 82 are used to secure the ring 78 to the plate 58 with the matrix held firmly against the depressed surface 74 by reason of the engagement of the overhanging ledge 79 of the ring 78, with the front surface of the matrix. Dowel pins 83 may be provided on the plates 58 to assist in positioning the plate with respect to the upper platen 34 or with respect to the bolster plate 20 carried by the platen 18.

The caps 66 may be provided with spanner holes 66' to assist in assembling the cap and plate, or in removing the cap from the plate, but said holes should not extend through the said cap.

Referring now to Fig. 6, into the opening 83 in the cap 66 of the upper mold 31, a pipe 84 is threaded. Said pipe 84 communicates through an elbow 85 with another pipe 86 which in turn is connected to a pipe 87, and these pipes form the conduit for steam or water to the spiral groove or channel 60 of the said mold. An opening 88 in the leaf or platen 34 is provided for the piping above described.

Similarly, the tapped hole 73 of the cap 66 of the lower mold 22 communicates with a pipe 89 which through an elbow 90 and pipe 91 is connected to a pipe 92. These pipes form the conduit for steam or water to the spiral groove or channel 60 of the lower platen 18. An opening 91' in the lower platen 18 is provided for the piping above described.

It is to be noted that the hole or opening 88 and the leaf or plate 34 and the opening 91' in the lower platen 18 are so large that the piping above described pass loosely therethrough to provide a passageway through which a continuous steam or water tight piped conduit as above described may pass directly through the platens to the molds.

A pipe 93 communicates with the tapped hole 61 of the plate 58 of the upper mold 31, and forms a discharge outlet for the upper mold 31, and similarly a pipe 94 communicates with the tapped hole 61 of the plate 58 forming the lower mold 22 and forms a discharge outlet for the lower mold 22, (see Figs. 2 and 6). The pipes 87 and 92 are connected through a manifold to a duplex valve, both later described, by the operation of which steam or any other suitable heating medium, or water or any other suitable cooling fluid are alternately admitted to and conducted through the molds. In operating the press, the molds are heated during the molding or pressing operation, and are then cooled after the material has been molded and while the material is held between the dies or matrices in the press, to harden the molded record prior to its removal from the press. Preferably, each plate 58 is slightly cut away at the sides, as at 75', (see Fig. 11), to form a narrow space through which the excess of the material being pressed may make its exit from between the dies.

For operating the piston or plunger 11, (see Figs. 1 and 6), the bed 2 is provided with a port or inlet 95 communicating with the cylinder 9, said port being connected by a suitable pipe 96 with the hydraulic controlling valve 97, preferably mounted on a lug 97' on the outside of the arm 5. The valve 97 with its connections, are shown in Figs. 1, 2 and 3, and the construction of the valve proper is additionally illustrated, in detail, in Figs. 17 to 28 inclusive.

This valve 97 is a double valve and comprises a casing 98 provided with a spot or projection 98' arranged to be secured to the lug 97' of the bed. Within the casing 98 are two valve seats 99 and 100. Upon the seat 99 is an inlet valve 101, the stem 102 of which extends upwardly through a stuffing box 103 on one side of the valve casing and its upper end is provided with an adjusting screw 104 (see Fig. 21). An exhaust valve 105 is arranged to be seated on the seat 100 and its stem 106 passes upwardly out of the casing through a stuffing box 107. The upper end of the stem 106 is also provided with an adjusting screw 108. (See Figs. 17 and 21.)

Inasmuch as the valves, springs for holding the valves on their seats, stuffing boxes and packing rings, are substantially alike in construction in the two sides of this hydraulic valve, it is thought that the showing of one of said valves with the parts arranged in operative relation, as illustrated in Fig. 17, will be sufficient for the purpose. However, in Fig. 21, the positions of two valves with respect to the chambers and ports within the casing are indicated in dotted lines.

As the arrangement and direction of the various passages in the valve casing is rather difficult to illustrate, the detailed drawings of the valve casing, (Figs. 21, 22, 23 and 24), should be considered in connection with the diagrammatic illustration shown in Figs. 18 and 19. When these details are read in connection with the said Figs. 18 and 19, it is believed that the construction will be very clear.

The stuffing boxes 103 and 107 are identical in construction. Referring to Fig. 17, the valve 105 is shown unseated from its seat 100. The stem 106 of the valve 105 passes through the stuffing box 107, and the adjusting screw 108 is screw-threaded into the upper end of the stem 106, and is therefore capable of being longitudinally adjusted with respect to the said stem and locked in any adjusted position by means of a nut 109. A similar screw 104 with its locking nut 110, secured to the stem 102 of the valve 101, is indicated in Figs. 17 and 21.

Beneath the stuffing box 107, a suitable packing ring 111 is provided, said packing ring being positioned with respect to said casing by means of a washer 112 seated on a ledge or shoulder in the casing, and provided with a series of holes or perforations 112'. Said packing ring 111 is preferably similar in construction to the packing ring 17 of the piston or plunger 11; that is to say, it consists of a leather ring U-shaped in cross-section, the open side of the said ring being adjacent the washer 112. The hollow part of said ring 111 is preferably tightly packed with a suitable packing 111' such as hemp packing. The openings 112' constitute passages through which the liquid, under high pressure, beneath the valve passes from the chamber 124 to the hemp packing 11 to expand the sides of the U-shaped ring 111 and force them into very close water tight engagement with the interior of the casing and with the stem 106 of the valve.

The lower stem 106' of the valve 105 passes downwardly through another similar packing ring 113 filled with suitable packing 113', preferably hemp, and held between the ring or washer 114 provided with perforations 114' and the inner face of the hollow plug or closure 115. The pressure of the fluid in the valve, acting through the perforations 114' in the valve acts, (as above described, in connection with the ring 111), to tightly hold the ring 114 in engagement with the stem and interior of the casing. The hollow plug 116 of the valve 101 is shown in elevation in Fig. 17, but the same is not illustrated in cross section in the drawings because its construction is like that of the plug 115, shown in cross section in Fig. 17, and because the parts contained therein are exactly like the parts inclosed within the plug 115, and clearly illustrated in Fig. 17. Within the hollow plug 115 a coiled spring 117 is provided, the upper end of said coiled spring being in engagement with the lower end of the valve 105, and the lower end of said spring being in engagement with the adjusting and locking nuts 118. As above stated, the hollow plug 116 is similarly provided with a coiled spring, similarly arranged and similarly adjusted and acting on the lower stem 102' of the valve 101.

It will be apparent that the function of these springs is to tend to hold the valves 101 and 105 on their seats 99 and 100, and that the force or tension which said springs exert upon said valves may be easily adjusted and regulated.

Referring next to Figs. 21 to 24, above the inlet valve seat 99 is a chamber 119, from which extends horizontally a port or opening 120, (Fig. 22), communicating with a vertical passage 121. From this passage 121 another port 122 extends horizontally into the chamber 123, (Figs. 22 and 23), beneath the exhaust valve 105. Above the exhaust valve 105 is a chamber 124, (Figs. 21, 22 and 23), from which laterally extends a port 125 communicating with an outwardly extending passage 126.

Beneath the inlet valve 101 is a chamber 127, (Fig. 21), with which communicates the inlet port 128, and from the chamber 123 beneath the exhaust valve 104 is a port 129, which communicates with the pipe 96 described above, which communicates with the hydraulic cylinder 9.

It may here be stated that it is not alone the tension of the springs acting on the valves 101 and 105 which holds the valves upon their respective seats. The water, the flow of which is controlled by the said valves, is under a high pressure, and the direction of the flow of the fluid through the valve is from the chambers 123 and 127 beneath the valves into the chambers 119 and 124 above the valves. The fluid controlled by the valves, therefore, also tends to hold the valves upon their respective seats, and tends to move the valves toward their seats when being closed.

The passages above the chambers 119 and 124 are provided with screw threads 130 and 131 respectively for the purpose of securing thereto the stuffing boxes 103 and 107.

The passages below the chambers 127 and 123 are also provided with screw threads 132 and 133, to receive the threaded ends of the hollow plugs 116 and 115 respectively. If the passages or ports 120, 121, 122 and 125 are formed by drilling or boring, the outer ends of the holes so formed should be closed in any suitable manner as by plugs 134. The passage communicating with the inlet ports 128, and that communicating with the port 129, (Fig. 24), are also provided with screw threads 135 and 136 respectively, in order that the same may be attached to supply and exhaust pipes later described.

Extending upwardly from the casing 98 are two supports 137 and 138, (Figs. 17, 20, 21 and 23), the same being located in a plane substantially midway between the valves 101 and 105, and a valve operating lever 139, extending over and in operative relation with respect to the adjusting screws 104 and 108 of the valve stems 102 and 106, is pivotally mounted on a shaft 140 extending through openings 141 and 142 in the upper ends of said supports 137 and 138 respectively.

Referring now more particularly to Figs. 17, 20, 25 and 28, the inner end of said lever 139 is pivotally connected with a connecting rod 143 by a pivot pin or rod 144, and the lower end of said connecting rod 143 is attached to a crank or eccentric pin 145 mounted on the end of the shaft 146, journaled in a bracket 147 mounted on the valve casing 98. The lever 139, the eccentric or crank pin 145, and the parts connected thereto, are so arranged that when the eccentric pin 145 is in its highest or its lowest position, the lever 139 will engage and depress one or the other of the adjusting screws 104 and 108 to move the valve to which it is connected from its seat to allow the water to pass through said valve. There is, however, a position between these two extreme positions of the said eccentric, in which the lever does not engage either stem, such position being indicated in Fig. 28.

In the particular embodiment of my invention illustrated in the drawings, when the eccentric pin 145 is in its uppermost position (see Fig. 17), the lever 139 will press against the adjusting screw 108 and force the valve 105 off its seat; and when the eccentric pin 145 is in its lowest position, (see Fig. 25), the lever 139 will engage the adjusting screw 104 to force the valve 101 off its seat. This shaft 146 is adapted to be given substantially a one-half revolution to bring the eccentric 145 to its uppermost or its lowermost position, or to a middle position between said two extreme positions, by means of an operating handle 148 rigidly secured in any suitable manner with the shaft 146.

In the particular embodiment of my invention shown in the accompanying drawings, I have provided a timing device, by means of which the turning of the shaft 146 may be prevented at certain times or periods for certain purposes, and this timing device will be described below. This handle 148 is connected directly to the outer end of the shaft 146 through any suitable crank or lever. For the purpose of the present explanation, the cylinder 149, of the timing mechanism, which cylinder is rigidly mounted to and secured upon the outer end of the shaft 146, may be considered, as it is, a crank or lever through which motion may be communicated from the handle 148 to the shaft 146, to move the said shaft 146 through an arc of substantially 180°.

The pipe 96, (Figs. 1, 2, 20 and 24), one end of which is threaded into the screw threads 136 of the chamber 123 with which the port 129 communicates, extends and is connected to the opening or port 95 of the hydraulic cylinder 9. Another pipe 150, is attached through the screw threads 135 to the valve body or casing 98 and communicates through the inlet port 128 with the chamber 127. This pipe 150, may be connected to any suitable source of hydraulic pressure, and constitutes the supply pipe by means of which water, under a high pressure, is admitted to the valve, and by the manipulation of the valve, and thence to the cylinder 9 for the purpose of elevating the plunger 11 to press the material between the dies or matrices. A third pipe 151 is attached by the screw threads 152 with the casing 98 and thus communicates with the chamber 12 through the passages 126 and 125. The passage 126, is an exhaust port of the valve, and the pipe 151 is the exhaust pipe by means of which water may be conducted away from the cylinder 9 by a proper manipulation of the hydraulic controlling valve 97. It will, therefore, be apparent that to admit water at high pressure to the cylinder, the adjusting screw 104 is depressed, and to discharge the water from the cylinder after the pressing operation is completed, the adjusting screw 108 is depressed. It will be further apparent that the depressing of the screws 104 and with it the valve 101 is effected by turning the handle 148 in the direction of the arrow 153 of Fig. 17. The screw 108 is depressed and with it the valve 105 when the handle 148 is being brought to its uppermost position, as shown in Fig. 17.

The passage of the fluid through this controlling valve 97 is diametrically illustrated in Figs. 18 and 19. When the stem 102 of the valve 101 is depressed, water, under pressure, or any other similar fluid is admitted through the pipe 150 and inlet port 128 to the chamber 127, and thence past the valve 101 into the chamber 119, and thence through the port 120 and passages 121 and 122, to the chamber 123 beneath the valve 105. From this chamber 123, the fluid passes through the port 129 and through the pipe 96, connected thereto to the hydraulic cylinder 9 and entering beneath the piston or plunger 11, forces the piston upwardly, against the tension of the coiled springs 29, to press the material placed between the dies or platens. Before the valve 101 and its stem 104 is depressed, the handle is of course in its uppermost position, as shown in Fig. 17, and depresses the stem 104 and to thereby force the valve 101 from its seat, the handle 148 is turned in the direction of the arrow 153, (Fig. 17) and while pressure is being applied, the handle 148 is in its lowest position, as shown in Fig. 25. After the pressing has been completed, the handle is turned back in the direction of the arrow 154, (Fig. 17), and the valve 101 will rise under spring pressure and the high pressure of the fluid and be firmly seated on its seat 99. After this is effected, the stem 106 will be depressed to force the exhaust valve 105 from its seat 100. The coiled springs 29 are then free to draw or pull the plunger or piston 11 downwardly within the cylinder 9, forcing the water or other fluid beneath the piston out through the port 95 and pipe 96, port 129, (see Fig. 19), into the chamber 123 beneath the valve 105. The valve being now open, and the valve 101 closed, the fluid passes upwardly past the valve 105 into the chamber 124 and thence through the passages 125 and 126 to the exhaust pipe 151. From the above, it must be apparent that when the handle 148 is in its uppermost position, the exhaust valve 105 is open and the fluid is free to pass from the cylinder 9 through the valve 97 to the exhaust pipe 151, and that when the handle 148 is in its lowermost position and the inlet valve 101 is open, the fluid under high pressure is admitted through the inlet pipe 150 and through the valve 97 to the pipe 96 and thence to the cylinder 9.

When the press forming the subject-matter of this application is used to mold or form articles such as sound records out of thermo-plastic material, that is to say, material which when heated is soft and readily takes an impression and is readily molded to any desired form, and, when cool is hard and rigid, the dies or molds between which the material is molded is heated during the pressing or molding operation, and the platens or dies are cooled after the impression has been made, and while the molded material is still held under pressure in order that the material may be sufficiently stiff and hard to be removed from the dies and retain the impression given thereto.

In order that the heating and cooling of the upper and lower molds, and the dies or matrices attached thereto, may be effected, the said platens are provided with the inlet pipes 87 and 92 respectively, and the exhaust or discharge pipes 93 and 94 respectively. The said pipes 87 and 92 are connected through a manifold to a controlling valve which will be for convenience hereafter termed the "duplex valve", reference to which constructions will now be had, particularly in connection with Figs. 1, 2 and 5, wherein the duplex valve and manifold 155 are shown disposed at the left hand side of the press; to Figs. 29 and 30, in which the same are shown assembled on a larger scale, and partly in section; with Figs. 34 and 35 inclusive, in which details of the casting or casing of the duplex valve is illustrated on a still larger scale, and the ports and passages are shown therein; with Figs. 36 to 40 inclusive which similarly illustrate the manifold casing and with Figs. 41 and 42, which are diagrammatic views showing in a perspective or isometric manner the relation, disposition and direction of the various passages through the duplex valve and manifold with respect to each other, and the course of the heating fluid, (steam), and of the cooling fluid, (water), therethrough as the duplex valve is operated or manipulated to heat or cool the molds.

The duplex valve and manifold 155 are supported by the bracket 156, secured to the outside of the upwardly extending post or arm 4 and consists, generally speaking, of two castings 157 that of the duplex valve, and 158, that of the manifold, permanently secured together, having passages therethrough, and provided with valves and check valves, as described below. The casting or casing 157 is particularly illustrated in Figs. 34 and 35. As each of the two valves mounted within this casing are identical in construction and arrangement, but one of these valves is specifically illustrated in its assembled condition, for which see Fig. 29, which shows the valve 160 for admitting steam or other heating fluid through the valve and thence to the upper and lower molds. Within said casing 157, is a conical valve seat 159, against which a valve 160 is normally seated. This valve 160 is provided with a stem 161, which extending forwardly toward the front of the machine through the packing 162 and sleeve 163, held in place by the cap 163', constitutes the means through which the valve 160 may be forced from its seat 159 when desired.

Extending rearwardly from the valve 160 is a second stem 164, terminating in a cup 165 within which is arranged a coil spring 166, the inner end of which engages the end of the stem 164, and the outer end of which is in engagement with the inside of a hollow cap or closure 167 secured to the casing 156 by screw threads 168. The bottom of the cup 165 is preferably perforated with holes 169, which give free communication between the chamber 170 and the interior of the cap or closure 167. This chamber 170 is the chamber in which the valve proper, 160, is contained, and said chamber communicates through a port 171 with a pipe 172 connected to a suitable source of steam pressure. The valve 160, immediately beyond the seat 159, is provided with radially extending fins or webs 173, (see Fig. 32), which bear against the interior of the passage 174 to steady and guide the valve into position with respect to its seat 159. Communicating with the passage 174 is a chamber 175 which extends inwardly toward the middle of the valve for a short distance, (as shown in Figs. 34 and 35), and communicates with the upwardly arranged port or passage 176. The passages and valve construction last above described is all substantially contained within a substantially cylindrical port of the casing 177 of the lower casting 157, and comprises substantially one-half of the said casting. The other half of the casting is, generally speaking, the duplicate of that above described, and consists of a substantially cylindrical casing 178, (see particularly Figs. 30, 34 and 35). Within this casing 178 is a valve seat 179, upon which is seated a valve 180, (shown in dotted lines in position in Fig. 34), identical in construction with the valve 160. The rear end of the cylindrical portion 178 of the casing 157, is provided with screw threads 181 for the attachment thereto of a cap or closure 182 like the cap or closure 167, within which is a cup 183', coacting with a coil spring (like the coil spring 166, but not specifically illustrated), to act upon the rearwardly extending stem 183 of said valve 180 and the inside of the cap 182. Said valve 180 also has a forwardly extending stem 184 passing through a gland 185, in exactly the same manner as the stem 161 of the valve 160 is mounted. This last mentioned valve 180 is a valve by means of which a cooling fluid, such as cold water, may be admitted to the valve and thence to the upper and lower molds.

The valve 180, is substantially within the chamber 186 which communicates through a port 187 with a pipe 188 connected preferably to a suitable source of water supply, (see Fig. 35). From the chamber 186 is a forwardly arranged passage 189 communicating with a chamber 190 which also extends inwardly toward the middle of the casing and communicates with an upwardly extending port 191. (See Figs. 34 and 35). As is here clearly illustrated, the two ports 176 and 191 extend upwardly parallel with each other, and are symmetrically arranged within a shallow circular depression 192 in the top face 193 of said casing. Said top face 193 is preferably substantially rectangular in shape and is provided with tapped holes 194 for the reception of bolts 195 (see Fig. 29) by means of which the upper casting or casing 158 may be secured thereto.

The casing 158 of the manifold (see Figs. 29 and 36 to 40) comprises generally a base 196, having a downwardly extending, short cylindrical projection 197 arranged to fit into the shallow circular depression 192 of the casing 157. Said base 196 is substantially rectangular and of the same size and shape as is the top surface 193 of the casing 157. Said base 196 is provided with holes 198 in registration with the holes 194 of the top surface 193 of the lower casting 157 for the reception of the said bolts 195. Extending upwardly from the base 196, is a web-like portion 199 having therein two vertical ports or passages 200 and 201, (see Figs. 36 and 40), in registration and communication with the ports 176 and 191 of the lower casting respectively. The top end of the port 200 communicates with a horizontal passage 202, which in turn communicates with a transverse passage 203, (Figs. 36, 37 and 40), in substantially the same plane as the port or passage 202, but arranged at right angles thereto, and the opposite ends of said port or passage 203 communicate with chambers 204 and 205 respectively, (see Figs. 36 and 40).

Similarly, the top end of the port 201 communicates with a horizontal passage 206, (see Figs. 37, 38 and 39), extending in the opposite direction to the passage 202 above described, and said passage 206 communicates with a transverse passage 207, the opposite ends of which communicate with chambers 208 and 209 respectively. The top edges of the chambers 204, 205, 208 and 209 are provided with conical valve seats 210, 211, 212 and 213, (see Figs. 36, 37, 39 and 40), respectively, and the passages 203 and 207 communicate with the said chambers 204 and 205, and 208 and 209 respectively, below said valve seats. Above said conical valve seats 210, 211, 212 and 213, are respectively located valve chambers 214, 215, 216 and 217, (see Figs. 36, 37, 39 and 40). The chambers 214 and 216 are in communication with each other through a straight port or passage 218, (Figs. 36 and 37), and similarly the chambers 215 and 217 are in communication with each other through a similar port or passage 219 (Fig. 36). From the chamber 214, (see Figs. 36 and 37), a port 220 which is connected through the pipe 87 with the upper mold 31 of the press, and the chamber 215 (see Fig. 36) communicates through the port 221 with the pipe 92, the opposite end of which communicates with the lower mold 32 of the press.

It may here be stated that portions of the pipes 87, 92, 93 and 94 may be, and preferably are, made of flexible tubing or hose in order to permit of the movements of the upper and lower platens and the molds mounted thereon during the operation of the device.

It may also be here observed that the pipes 87 and 92 pass loosely through openings in the leaf or upper platen 33 and the lower platen 18 respectively, as previously described, in order that their inner ends may communicate directly with the port communicating with the inner end of the spiral groove or channel in the mold, and this makes it unnecessary to make steam tight joints directly between the molds and the upper and lower platens respectively.

Mounted in the chambers 214, 215, 216, 219 and normally seated upon the valve seats 210, 211, 212, 213, respectively, are check valves 222, 223, 224, 225, as plainly indicated in Fig. 30, and as diagrammatically shown in Figs. 41 and 42. These four check valves are alike in construction and a detailed showing and description of one of them will, therefore, suffice for all. The interior construction is plainly set forth in Fig. 29 with respect to the check valve 224. This check valve consists of a valve member 226 seated upon the valve seat 212 and extending down into the chamber 208 beneath the valve seat, said member being provided with radially extending guiding ribs 227 slidably engaging the interior of the chamber 208 to steady and guide the valve in its motion relative to its seat. Upwardly from said valve member 226, is a valve stem 228, the upper end of which slidably fits into an opening 229 in alinement with said stem in the cap 230, which, by screw threads 231, is united, joined or connected to the upper casting or casing 158 above the valve chamber 216. Surrounding said stem 228 and engaging the upper side of the valve member 226 and the inner cupped face 232 of the cap 230, is a coiled spring 233, the tension of which is such as to tend to hold the valve member 226 upon its seat 212. The opening or hole 229 in the cap 230 extends through the same longitudinally and above the end of the stem 228. Said opening or hole 229 is provided with screw threads 234 within which is fitted the threaded adjusting screw or stem 235, the outer end of which is provided with a hand wheel 236, such as are usually provided for valve structures. The upper and outer end of the cap 230 is provided with a packing containing cup 237, united and adjustable with respect to the said cap by screw threads 238, so that a packing 239 inserted around the stem 235 and within the cup 237 will form a steam and water tight closure around the stem 235. In operation, the end of the stem 235 is slightly separated from the end of the stem 228. It will, therefore, be apparent that when any fluid under high pressure is admitted into the chamber 208 beneath the valve member 226, the valve member 226 will be lifted from its seat and allow the fluid to pass from the chamber 208 into the chamber 216 above the valve member 226. The extent to which the valve member 226 will so be lifted, will depend upon the distance between the upper end of the stem 228 and the inner end of the threaded adjusting screw or stem 235. The amount of fluid, therefore, allowed to pass said check valve may be readily regulated by turning the hand wheel 236 to bring the inner end thereof nearer to or remote from the upper end of the valve stem 228.

The valves 222, and 225 are provided with similar hand wheels 236, for adjusting the valve members for controlling the amount of fluid allowed to pass through said check valves. As stated above, upon the valve seats 212, 213, and 215 are like check valve structures, as clearly indicated in Figs. 29 and 30, and the diagrammatic Figs. 41 and 42.

Upon the outside of the upwardly extending post or arm 3, (see Figs. 5, 29, 30 and 31), is a bracket 240 provided with an upwardly extending lug 241 having holes therein through which the forward ends of the valve stems 161 and 184 extend. Upon the upper side of said bracket 240, a three armed lever 242 is pivoted upon a bolt or pin 243. The two oppositely extending arms on the said lever are provided with adjusting screws 244, 245 arranged normally in alinement, and adapted to coöperate with the ends of said valve stem 161 and 184 respectively. The third arm of the lever 242 is substantially in the form of a yoke 246 having parallel inner sides arranged to engage the opposite sides of an anti-friction roller 247 mounted on an eccentric pin or crank 248 carried by the upper end of a shaft 249, passing downwardly through and journaled in the bracket 240. The axis of the eccentric pin 248 is parallel to, and eccentric with respect to the axis of, the shaft 249. To the lower end of the shaft 249 is secured a handle 250, preferably provided with a stop lug 251, arranged or adapted to limit the angle through which the handle 250 may be turned to substantially 180° by reason of the engagement of said lug 251 with shoulders 252, 253 of the bracket 240 when the lever 250 is moved to the limit of its movement in either direction about the axis of the shaft 249. When the lever 250 is in the position shown in Fig. 30, the adjusting screws 244 and 245 are substantially out of engagement with the ends of the stems 161 and 184 respectively, but when the lever or handle 250 is thrown to the position shown in Fig. 31, the screw 244 will engage the end of the stem 161 and force the valve 160 from its seat. Conversely, when the handle 250 is thrown in the opposite direction, that is, until the lug 251 engages the shoulder 252, the screw 245 will engage the end of the stem 184 and force the valve 180 from its seat 179. By throwing, therefore, the handle or lever 250 to one or the other of its extreme positions, the normally closed valves 160 and 180 are alternately opened. When the handle 250 is midway between its two extreme positions, the adjusting screws 244 and 245 are out of engagement with the stems 161 and 184, and both valves will be in their normally closed positions. The adjusting screws 244 and 245 may be, and preferably are, provided with locking nuts 254 to secure the stem in any adjusted position. If the passages 203 and 207 and the passages 202 and 206 be formed by drilling or boring into the casting 158, the outer ends of such of the holes or openings thus formed, should be closed as by suitable plugs 158′.

Inasmuch as the details of the construction of the duplex valve and manifold have now been set forth in full, the operation of the same will now be readily apparent, particularly if reference be had to diagrammatic Figs. 41 and 42. In said diagrammatic figures, the shape of the passages through the duplex valve and manifold are not indicated, but the general directions which the fluids take in passing through them are very clearly set forth. The valves of the duplex valve are diagrammatically indicated by circles 160 and 180, and the check and regulating valves of the manifold by the circles 222, 223, 224 and 225. In the operation of this valve and manifold, a steam pipe 172 is connected to the port or passage 171, and a cold water pipe 188 is connected to the port or passage 187 of the lower casting or casing of the duplex valve 157. Fig. 41 shows in heavy black lines the passages which are operative and the direction of the steam therethrough when the valve 160 is pressed from its seat by throwing the handle 250 to the position shown in Fig. 31, and Fig. 42 similarly shows the course which the cold water takes through the duplex valve and manifold when the handle 250 is thrown to a position substantially 180° from that shown in Fig. 31. So far as the operation of the duplex valve and manifold is concerned, the pipe 172 might be connected to the cold water supply and the pipe 188 to the steam supply, and the same results would be effected, but for convenience in describing the same, however, the pipe 172 will be considered as the steam pipe and the pipe 188 the cold water pipe. Taking first the course of the steam through the duplex valve and manifold, the said fluid will enter through the pipe 172, and port or passage 171 to the chamber 170, containing the valve 160. The valve being off its seat, the steam will pass by the valve 160 through the passage 174 and between the fins or webs 173 (see Fig. 32) of the said valve into the chamber 175, thence inwardly toward the middle of the duplex valve casing to a vertical passage 176 therein, and thence it passes directly into the vertical opening or port 200 through the base of the manifold 158. From the upper end of the port or passage 200, the steam will pass rearwardly through the passage 202 to the transverse passage 203 by means of which passage, the fluid will enter the chambers 204 and 205 beneath the check and regulating valves 222 and 223, lifting them from their seats, the amount of lift being determined and regulated by the hand wheels 236. Passing the said valves the steam will enter the chamber 214 above the check valve 222 and thence through the opening or port 220 into the pipe 87 and thence to the upper mold 31 of the press. The steam will also pass the check valve 223 into the chamber 215 and thence through the port 221 to the pipe 92 and into the lower mold 22 of the press. While from the chamber 214, a passage 218 extends to and communicates with the chamber 216 above the check valve 224, the steam cannot pass below the check valve 224, and similarly the check valve 225 prevents the steam from passing from the chamber 215 and passage 219 past and below the check valve 225. From this it must be plain that by throwing the handle 250 to the position shown in Fig. 31, steam is simultaneously admitted to both the upper and lower molds of the press.

Now referring to Figs. 6 and 10, the steam, entering the pipe 87 passes through the pipe 86, elbow 85 and pipe 84 to the port 73 communicating with the end of the inner convolution of the spiral groove 60 of the upper mold 31, and following a spiral course through said mold, will make its exit from the end of the outer convolutions of the spiral groove 60 through the port or passage 61 to the exhaust pipe 93, which may be connected to any suitable waste pipe.

Similarly, the steam passing through pipe 92 connected with the chamber 221, and through the pipe 91, elbow 90 and pipe 89 in the lower platen 18, in communication with the end of the inner convolution of the spiral groove 60 of the mold 22 and traversing said groove makes its exit from the platen through the port 61 communicating with the end of the outer convolution of the said groove 60. The port 61 of the lower mold 22 is attached and communicates with the exhaust pipe 94 which is also connected to a suitable waste pipe. When the handle 250, (see Fig. 31), is thrown to a position at substantially 180° from that shown in said Fig. 31, the stem 184 will be depressed to move the valve 180 from its seat and the valve 160 will close under the influence or action of the spring 166 and the pressure of the steam contained within the chamber 170.

Referring now back to Fig. 42, the heavy line shows the passage of the water through the duplex valve and manifold. The valve 130

180 being forced from its seat, cold water will enter the duplex valve through the pipe 188, opening through the port 187 into the chamber 186 and past the valve 180 into the passage 189 and then into the chamber 190, thence passing inwardly to the lower end of the vertical passage 191 of the casing 157 of the duplex valve. From this point the water will pass upwardly through the opening or passage 201 in the base of the upper casting 157 of the manifold, and through the horizontal passage 206 to the transverse passage 207 which communicates with the chambers 208 and 209 beneath the check and regulating valves 224 and 225 respectively. The pressure of the water will lift the said check valves 224 and 225 from their seats and will pass into the chambers 216 and 217 above the valves 224 and 225 respectively. From the chamber 216, the water will pass through the horizontal passage 218 rearwardly to the chamber 214 above the check valve 222. Said check valve 222 will prevent the passage of the water to the chamber 204 beneath said valve 222 and the water will, therefore, pass through the port 220, and the pipe 87, and thence to the upper platen 31 of the press. Similarly, the water will pass from the chamber 217 above the valve 225 through the passage 219 to the chamber 215 above the check valve 223, and through the port 221 to the pipe 92 communicating with the lower platen of the press. The check valve 223 will prevent the water from passing into the chamber 205 beneath said valve.

By alternately throwing or moving the handle 250 to its extreme position, steam and water are thus caused to alternately circulate through the upper and lower molds of the press to heat and cool the same as may be desired. After say the water has been passed through the molds to cool the same and the dies and the pipes connected thereto are filled with water, that water is expelled by the steam next admitted, and conversely, the water in passing through the valve will drive out such steam as may have been left from the preceding operation.

The molds are preferably constructed with a spiral groove 60 therein for the purpose of affording a relatively long channel or passage through which the heating or cooling fluids are caused to pass, in order that the molds may be quickly and uniformly heated and cooled. As above described, the fluids are preferably admitted to said molds through the ports communicating with the inner ends of the spiral grooves or channels, and is discharged through the ports communicating with the outer ends of the said spiral grooves or channels, although this course of the said fluids through the molds may be reversed if desired.

From the foregoing, it will be apparent that the valves 160 and 180 are supply valves which admit heating and cooling fluids to the molds, and that the valves 222, 223, 224 and 225 are check and regulating valves. The steam, for instance, enters the chambers beneath the valves 222 and 223, and lifts them from their seats but is not permitted to pass through the check valves 224 and 225 because the said steam enters the chamber above the seats of said two last mentioned valves, and the tendency of the steam in the chambers 216 and 217 above the valves 224 and 225 is to hold the said valves on their respective seats, and, therefore, in a closed condition.

Similarly, the water passing through the manifold enters the chambers beneath the valves 224 and 225 lifting them from their seats but the water, passing on, enters the chambers 214 and 215 above the check valves 222 and 223 respectively, and the pressure of the water tends to hold the said valves 222 and 223 on their seats and in a closed condition.

The hand wheels with which each of the check and regulating valves 222, 223, 224 and 225 are provided, are not mounted on the stems of the said valves, but are connected to separate stems. As shown in Fig. 29, the hand wheels 236 with their screw threaded stems 235 are for the purpose of adjusting the distance which the check valves may be lifted from their seats by the fluid entering the chambers below the same. By turning the hand wheel 236 to slowly move the stem 235 longitudinally of the cap 230, the distance between the lower end of the stem 235 and the top end of the stem 228 of the valve member 226, may be carefully adjusted and the amount of fluid allowed to pass through and by the valve may be accurately controlled and regulated. The said valve may, however, be absolutely closed by turning the handle 236 until the end of the stem 235 firmly engages the upper end of the stem 228 and the valve member 226 is moved down to and upon its seat 212. The same construction and operation is present in each of the check and regulating valves 222, 223, 224 and 225.

In pressing objects, out of thermoplastic material, it is very desirable that the molds of the press, between which the plastic material is being molded, remain closed and the material held under pressure for a length of time necessary to effect in the plastic material, a perfect impression; that is to say, a time sufficient to allow the material to flow and fill in and around the irregularities in the surface of the die and that after receiving the impression the molds should be cooled while the molded mass is still under pressure. This is particularly desirable in pressing such objects as sound records in which slight imperfections due to any failure of the material to flow and perfectly conform to the very small lines or ridges of the sound record matrix, would be liable to result in the production of imperfect records of sound; that is to say, records, which, when used, in a sound reproducing machine, would not produce a true reproduction of the sound recorded. The improved press forming the subject-matter of this application is therefore provided with a timing device, by the operation of which the platens when once closed in pressing material between them, cannot be separated or opened until after a predetermined length of time has elapsed. This timer or timing device is operatively connected to a hydraulic valve 97 by means of which the movement of the pressing piston or plunger 11 is operated. This timing device is shown adjacent to, and mounted upon the hydraulic valve 97 in Figs. 1, 2 and 3. The details thereof are illustrated in Figs. 20, 25, 26, 27, 28 and 43. Figs. 44 to 47 inclusive indicate, in a general diagrammatic manner, various positions occupied by the parts of the said timing mechanism.

Secured to the outer end of the shaft 146, which is mounted in the bearing or bracket 147, (said shaft being the operating shaft for the hydraulic valve), by a rigid connection such as the tapered pin 255, (see Figs. 20 and 43), is a holder 256 (Fig. 43) consisting of a relatively short heavy base 257 (Fig. 20) extending radially from opposite sides of the shaft 146, provided with inwardly extending stop lugs 258, 259, and an outwardly extending ring 260 arranged substantially in the plane of the short heavy base 257, said ring being preferably constructed integral with the said base and stiffened by the ribs 261 and 262. Extending substantially radially from the shaft 146 from one end of the base 257, is an arm 265.

Mounted within the ring 260 is the cylinder or casing 149 having midway between its ends a ring 266 (see Fig. 43) the opposite faces, 267, of which are recessed conically to form a relatively narrow edge at the relatively small central opening 268 of the said ring 266. The ends of the said casing are substantially equidistant from the outer ring 260 and the inner ring 266, and the said outer ring 260, the cylinder 149 and the inner ring 266 are rigidly secured together as by screws 269. That side of the cylinder 149 nearest the shaft 146 is provided with a relatively narrow slot 270 extending substantially the entire length of the cylinder, the axis of the said slot being in a plane normal to and passing through the axis of the shaft 146 and therefore normal to the transverse axis upon which the said cylinder or casing may be turned. Within the cylinder 149 are two cylindrical cup-shaped heads 271, 272 adapted to freely slide within the cylinder longitudinally thereof. The head 271 is secured in any suitable manner, as by a screw 273, to an arm 274, extending into the cylinder from a sliding member 275, the width of which sliding member 275 is substantially the width of the slot 270 and fits within the same. The head 272 is similarly secured by a screw 276 with the arm 277, also extending inwardly from the sliding member 275 from a point near the opposite end of said member 275. The heads 271, 272 are, therefore, thus secured rigidly together at a fixed distance from each other, but the heads, with the sliding member 275, are free to slide longitudinally of the cylinder or casing 149. One end of the cylinder 149 is closed by a cap 278 secured thereto by screws 263, and the other end of the cylinder is also closed by a cap 279 secured thereto by screws 264, said former cap, 278, having projecting from one side thereof the handle 148, arranged with its axis substantially parallel with the axis of the shaft 146. The space within the cylinder 149 inclosed by the walls of the cylinder or casing 149, the heads 271 and 272 and the sliding member 275, is filled or partially filled with a material which will slowly flow through the hole 268, from one end of the cylinder to the other when the cylinder is inverted, and for this purpose, I may use small shot 280. The amount of shot 280 which is placed within the cylinder is that which will pass through the said relatively small aperture 268 in a given length of time, dependent upon the length of time required for the material in the press to receive a perfect impression. The head 271 may be provided with a plug 271' for inserting shot, or other slowly flowing material.

The sliding member 275 is provided with a longitudinal web or rib 281 extending outwardly from the cylinder and having its longitudinal median line passing through the axis of the shaft 146. The web 281 is divided into two substantially similar portions 282 and 283 respectively, separated by a slot or notch 284, equidistant from the ends 285 and 286 thereof. Mounted upon a bracket 287, preferably secured to the casing 98, is a plate 288, the forward edge of which is divided by a notch 289 into the two lugs 290 and 291. The notch 289 is a little wider than the width of the projecting portions 282 and 283 of the web 281 and the said web is arranged to pass freely therethrough when the casing 149 is in a vertical position, as will be later described. The plate 288 is preferably secured to the bracket 287 by a screw 292 and dowel pins 293.

On the casing 98 of the hydraulic controlling valve 97, is a web 294 forming a stop to coöperate with the inwardly extending stop lugs 258, 259 of the holder 256 to limit to substantially 180° the arc through which the cylinder or casing 149 may be turned. When the handle 148 is in its uppermost position, the stop lug 259 rests against the upper surface of the web 294, and when the handle 148 is in its lowermost position (that is to say, turned through an angle of 180° from its upper position shown in Fig. 45 to a position shown in Fig. 46), the stop lug 258 engages the underside of the web 294.

Mounted upon one side of the bed or body 2 of the members is a bracket 295, (see Figs. 3, 26, 27 and 28), provided at its upper end with a bearing 296 for a shaft 297. The inner end of the shaft 297 is provided with an arm 298 extending generally upwardly from the axis of the shaft 297 and provided at its upper end with an anti-friction roller 299. The outer end of the shaft 297 is provided with an arm 300 extending forwardly of the press and downwardly outside of the upwardly extending post or arm 5. The arms 298 and 300 are rigidly secured to the shaft 297 and forming a two-arm lever pivotally supported on the shaft 297. In the outer face of the upwardly extending post 5, is a pin 301 against which the arm 300 is normally held by a spring 302, one end of which is attached to said arm 300 and the other end of which is attached to the post 5 in any suitable manner.

When the locking bars 49 and 50 are in their rearward position, that is to say, out from under the locking lugs 3′, 4′, 5′, 6′, (as is the case when the leaf or platen 33 is ready to be swung upwardly to the position shown in Fig. 3, or immediately after it has been swung downwardly to the horizontal position, but before the leaf is locked), the anti-friction roller 299 on the end of the arm 298 lies underneath the locking lug 6′ and in the space occupied by the coöperating end 50′ of the locking member 50. Such position of the lever composed of the arms 298 and 300 is shown in Fig. 3 and in such position, the arm 300 is held against the stop pin 301 with its outer end in the path of movement of the arm 265. When, however, the locking bar 50 is moved forward so that the end 50′ thereof lies under the locking lug 6′, the forward face of the said nut 50′ engages the anti-friction roller 299 and turns the lever on the shaft 297, throwing the arm 300 downwardly out of the path of the movement of the arm 265, as clearly shown in Fig. 27. When, therefore, the leaf 33 is raised to the position shown in Fig. 3, or in fact, whenever the leaf or upper platen 33 is not locked to the bed or frame, the lever 300 lies in the path of the movement of the arm 265 and will prevent the cylinder 149 of the timing mechanism from being inverted. It will be impossible to turn the handle 148 from its uppermost to its lowermost position in order to invert the said cylinder (see Fig. 28).

When, however, the leaf 33 is so locked rigidly to the bed by the locking bars 49 and 50 under the lugs 3′, 4′, 5′, 6′, the arm 300 will occupy the position shown in dotted lines in Fig. 27; that is to say, out of the path of the movement of the lever 265 and the said cylinder may be inverted and the shaft 146 upon which it is mounted and by means of which the valve stems 204 and 208 are operated, may be turned through an angle of 180°. This movement of the said shaft 146 through an angle of 180° is the movement by means of which the inlet or exhaust ports of the hydraulic valve are opened and closed. In the embodiment of my invention, as illustrated in the drawings forming a part of this application, the inlet valve of the hydraulic valve is depressed when the handle 148 is moved through an arc of 180° from its upper to its lower position. When the leaf is not locked to the bed as has been above described, the lever 300 limits the angle through which the shaft 146 may be turned to substantially 90° as shown in Figs. 26, 27 and 28, and in that position the lever 139 will not have been depressed sufficiently far enough to engage the stem 104 of the inlet port, and, therefore, the inlet port of the hydraulic valve cannot be opened. This provides a mechanism whereby hydraulic pressure cannot be applied to the plunger until the pivoted leaf or platen 33 is locked rigidly with respect to the bed.

Referring now briefly to the operation of the timing device, and especially referring to Figs. 43 to 47, the device is shown in Figs. 43 and 46 with the parts in the positions in which they will be found shortly after the cylinder has been inverted from the position shown in Fig. 45 to the position shown in Fig. 46. Immediately after having been so inverted, the small shot 280 will begin to flow through an opening 268 in the ring 266, and into the lower half of the said casing. The head 271 will rest upon the free surface of the shot 280, and the sliding member 275 with the heads 271 and 272 attached thereto will slowly fall by gravity toward the lower end of the casing or cylinder 149. It will be observed that immediately after the cylinder 149 has been turned to the position shown in Fig. 46, the portion 282 of the web or rib 281 will slide down into the notch 288 between the lugs 290 and 291 of the plate 288 and while in such positions the lug 290 would lie in the path of the said portion 282 were it attempted to turn the handle back to its original position and would thus prevent the cylinder from being reverted to such a position as is shown in Fig. 44. When, however, the shot has all fallen through the opening 208 or an amount has fallen through sufficient to allow the sliding member 275 to fall sufficient to bring the notch 284 of the web 281 into the plane of the plate 288, the said notch 284 will permit the web 281 to pass the lug 290 and thus allow the handle to be turned to revert the cylinder back to the position shown in Fig. 44. The time which elapses between that when the said cylinder 149 was inverted from the position shown in Fig. 45 to that shown in Fig. 46, and the time when the cylinder may be reverted back to the position shown in Fig. 44, will depend upon the amount of material or shot 280 inclosed within the casing, the size of the shot and the diameter of the opening 268, all of which can be predetermined and regulated so that the time required for the sliding member to move to its lowest position is equal to that required for the forming in the dies of a perfect impression upon the material being pressed between them.

The ring 266 is substantially a partition which divides the cylindrical casing 149 into two parts, there being but a relatively small opening in the said ring for the passage of the shot. The cylindrical casing 149 is operatively connected to the lever 139 which controls the hydraulic valve so that in moving the lever from one extreme position to the other, the casing is moved through an angle of 180°. It is inverted to move the lever from one to the other of its extreme positions. Immediately after its inversion, the shot begin to flow through the opening from that portion of the casing in which they previously were, into the other portion of the casing, and the head 271 resting on the surface thereof slowly moves downwardly. The fixed stop 290 lies in the path of movement of the projecting portion 282 until said portion shall have slowly moved to a position substantially of nearest approach to the other end of the casing.

After the web 281 has moved from the position shown in Fig. 46 to the position shown in Fig. 47, the cylinder is free to be inverted back to the position shown in Fig. 44 and immediately upon being turned to said last mentioned position, the web 281 will begin to fall in the same manner as above described by reason of the flow of the shot from the then upper to the then lower compartment of the cylinder, and having started on such movement the cylinder is prevented from being turned by reason of the engagement of the portion 283 of the web 281 with the lug 291 until the notch 284 shall again fall to a position in alinement with the said lug as shown in Fig. 45.

It is to be understood that instead of shot, any other suitable material, such as sand or a liquid may be employed. It has been found, however, that fine shot is very well adapted to the purpose.

Before passing to a description of the operation of the device above described, several further details of construction should be set forth. In Fig. 15 is a fragmentary cross-sectional view showing the relative positions of the upper platen 33, the plates 58, the caps 66 and the bolster plate 20 of the lower platen in their relative positions during the pressing of a double faced record of sound. It is to be noted that the upper matrix 77 is provided at its center with a circular depression 303 within which is seated a center plate 304 having a threaded hub portion 305, which is screw threaded into the opening 74' of the plate 58, said center plate projecting slightly beyond the surface of the matrix 77, and the lower matrix 76 is similarly provided with a circular depression 306 within which is fitted a second center plate 307. This second center plate 307 merely rests in the recess 306, but is not positively secured thereto. The lower matrix 76 is secured to the face of the plate 58 by a screw 308 having a beveled head 308' fitting into a similarly beveled opening in the matrix 76 and screw threaded into the opening 74' of the lower plate 58. The screw 308 is provided with a centrally arranged opening 309 a little larger than the center opening through the center plates 304 and 307 into which is fitted the center pin 310 having a reduced upper end 310' which fits into the central openings of the center plates 304 and 307 and the openings 311 in the hub of the upper center plate 304, and which is provided with a shoulder 310'', to serve as an ejector of the record from the mold as will be later described. The said opening 311 in the center plate 304 preferably slightly tapers and increases in diameter as at 311', in order to give a clearance for such material as may be forced into the opening 311 during the pressing operation. The lower center plate 307 also projects above the top surface of the lower matrix 306. These center plates 304 and 307 are for the purpose of depressing circular labels 312—312 into and below the surfaces of the record 313 being formed.

The center pin 310 extends downwardly through the opening 309 of the lower center plate 307 (see Figs. 5, 6, and 16), and passing through alined openings in the bolster plate 20 and lower platen 18, passes into a transverse slot or opening 314 in the lower platen 18 immediately above the plunger 11, and its lower end rests upon the head of an adjusting screw 315 in the top of the plunger 11. The said lower end of said pin 310 passes through the clamping members 316 and 317, (see Figs. 6 and 9), of a clamp seated in a circular hole or recess 318 in a bar 319 loosely fitted within the transverse opening 314, and having its ends adapted to be engaged, near the end of the downward stroke or movement of the plunger, by the lugs 319' on the bed 2, (see Fig. 2). Between the clamping members 316 and 317 and on opposite sides of the center pin 310, or perhaps more correctly on opposite sides of the opening between said members for the receipt of said center pin 310, are two spiral springs 320 and 321, seated in recesses 322 in the adjacent surfaces of said clamping members, the tension of said springs being normally to force said members apart. A screw 323 passing through the bar 319 and having a reduced end 324 fits into a suitable opening in the clamping member 317, positions said member with respect to said bar, while in a similar recess in the clamping member 316 is seated the reduced end 325 of the locking rod 326. The inner end of the locking rod or shaft 326 is screw threaded into the bar 319. Its outer end extends through a suitable opening 327 in the head 18 to the front side of the machine where it terminates in a transverse rod or handle 328. It is understood, of course, that the clamping members 316 and 317, are free to turn to a limited extent freely on the reduced end 324 of the screw 323 and on the reduced end 325 of the rod 326, any extensive relative movement being prevented, however, by the engagement of the clamping members 316, 317 with the walls of the opening 318 in the bar 319. The bar 319 with the said clamping members 316 and 317 and the parts connected therewith, together with the center pin 310 and lugs 319 on the bed constitute a mechanism whereby after a record is formed between the molds, the record may be automatically ejected therefrom. The distance then between the shoulder 310″ on the pin 310 and the bottom of the bar 319 is so adjusted that when the plunger 11 is near the end of its downward stroke or movement, the ends of the bar 319 come into engagement with and rest upon the lugs 319′ of the bed. As the plunger continues to move downwardly, this bar 319 remains on the lugs 319′ and therefore the bar and the pin 310 clamped therein remain stationary while the plunger and the lower platen and the parts directly connected thereto continue their downward movement. When the lower edge of the lower center plate 307 comes into engagement with the shoulder 310″, however, the downward movement of the said lower center plate 307 is arrested while the lower platen, the lower mold and the lower matrix still continue their downward movement for a short distance (see Fig. 16). The result of this is that the finished record is automatically lifted from the mold. The said pin may be securely clamped and held between the clamping members 316 and 317 by turning the handle 328 and thus forcing the clamping members 316 and 317 toward each other against the tension of the springs 320 and 321. When, however, it is desired to unclamp or release the center pin 310 from between the clamping members 316 and 317, it is only necessary to turn the handle 328 in the opposite direction and the springs 320 and 321 will effect the necessary separation of the clamping members. The upper platen 33 is provided with an opening 33′ in axial alinement with the opening 74′ on the plate 58.

The general purpose, functions and movements of the various parts of the mechanism with respect to each other will be most readily understood by describing in sequence the various steps performed by the operator of the machine in pressing disk records of sound. So far as possible, reference will be had to Figs. 1 to 6 inclusive in which is shown in an assembled condition the greatest number of operative parts. When it is necessary to allude to details of construction, the figures in which those details are set forth will be referred to.

At the beginning of the operation, the parts of the press are in the position indicated in Fig. 3. The upper platen 33 is in its raised position exposing the upper mold 31 and the lower mold 22. The upper mold will have the upper matrix 77 secured to its face, and the lower platen will have the lower matrix 76 secured to its face as clearly indicated in Fig. 6. These platens will be presumed to be cool and the handle 250 of the duplex valve and manifold 155 will be in the position shown in Fig. 2. The handle 148 of the hydraulic controlling valve 97 will be in its uppermost position as in Figs. 3 and 5, the arm 300 will be in its uppermost position and in the path of the arm 265, as shown in Figs. 3 and 27, and the portions 282 and 283 of the web 281 of the timing device mounted in the cylinder 149 will be in its lowermost position, as shown in Figs. 3 and 45. The valve 105 will be off its seat so as to allow water to flow through said valve from the cylinder 9 to waste as shown in Figs. 17 and 19, and the lower platens 18 will be in their lowest positions as indicated in Fig. 1.

The first step which will be performed by the operator is to heat the upper and lower molds. This is effected by throwing the lever 250 from the position shown in Fig. 2 to the right in the direction of the arrow 250′ in Fig. 2; that is to say, to the position shown in Fig. 31, thus forcing the valve 160, (see Fig. 29), off its seat. The steam passes through the duplex valve and manifold and to the upper and lower molds, as has been fully explained and as is illustrated in Fig. 41. The steam passes through the pipes 87, 86, and 84 (see Figs. 2 and 6) to the inner end of the spiral groove 60 of the upper mold 31 (see Fig. 6) and passing through said spiral passage, makes its exit from the said mold through the port 61 (see Fig. 10) and thence through the pipe 93 (see Fig. 2) to waste. Simultaneously the steam passes from the duplex valve and manifold through the pipes 92, 91 and 89 (see Figs. 2 and 6) to the inner end of the spiral passage 60 of the lower mold 22 and traversing said spiral groove, makes its exit through the port 61 (see Fig. 10) and thence through the pipe 94 to waste. In this way both molds may be simultaneously heated to the proper temperature.

The mass of material to be molded is then placed upon the lower mold. The handle 57 is then grasped by the operator and drawn downwardly into the direction of the arrow 57' in Fig. 3. This swings the leaf or upper platen 33 and the parts carried thereby around the positioning shaft 39 until the mold 31 is in its proper horizontal position in alinement with the lower mold 22, the positioning being effected by the shaft 39 and by the surfaces 333 and 334 between which the opposite sides of the leaf or platen 33 snugly fit. In this position portions of the lower face of the leaf 33 will rest upon the seats 331 and 332 of the positioning lugs 329 and 330. When so seated and in such position, the handle 57 is then swung horizontally to the position shown in Fig. 2, thus drawing the locking bars 49 and 50 forwardly so that the ends thereof come under and fit snugly beneath the overhanging locking lugs 3', 4', 5' and 6' of the upwardly extending arms or posts 3, 4, 5 and 6. In moving forwardly, the end of the locking bar 50 engages the anti-friction roller 299 on the upwardly extending arm 298 (see Figs. 2 and 27) and rocks it forwardly and upwardly thus swinging the arm 300 to the position shown in dotted lines in Fig. 27 and out of the path of movement of the arm 265 of the timing device.

It might here well be noted that when the handle 148 is in its raised position, the piston or plunger 11 is in its lowermost position and the cylinder 9 contains substantially no water under pressure. Referring to Figs. 17 and 19, it will also be seen that in such position the valve 105 of the hydraulic valve 97 is off its seat. The cylinder 9 is, therefore, in communication with the waste or exhaust tank through the pipe 96, port 129, chamber 105, chamber 124, port 125, passage 126, and exhaust pipe 151. It should also be here noted that until the leaf or upper platen 33 has been brought to its pressing position and the locking bar 50 has been brought forwardly under the locking lug 6' (see Figs. 3, 26, 27 and 28) the arm 300 lies in the path of the arm 265 of the timing device, so that it is impossible for the operator to throw the handle 148 of the timing device through a greater angle than substantially 90°; that is to say, no farther than the position shown in Fig. 28. In such position (Fig. 28) the valve operating lever 139 will be out of operative engagement with the adjusting screw 104 of the valve 101, and, therefore, water, under high pressure cannot be admitted to the cylinder 9 until the leaf or upper platen is locked in its lowermost and pressing position.

The parts of the press in the pressing position above described and prior to the pressing operation are shown in Figs. 1, 5, 17, 19, 20 and 45. The upper platen 33 is in its locked position, the lower platen 18 is in its lowermost position and the arm 300, is in the position shown in dotted lines in Fig. 27.

The operator now grasps the handle 148 of the timing device, (now in the position shown in Figs. 1, 17, 20 and 45) and throwing it to the left turns the cylinder 149 through an angle of 180°, thus inverting the cylinder 149, bringing the handle to its lowermost position, as shown in Figs. 2, 25, 43 and 46. Such a turning of this handle 148 to the position above referred to, is now permitted by the lever 300, since said lever 300 is now out of the path of the arm 265 of the timing device. During this motion, the shaft 146 upon which the cylinder 149 is mounted, is also turned through an angle of 180°, and the eccentric pin 145 has moved to its lowest position, (Fig. 25) swinging the valve operating lever 139 on its pivot 140 so as to engage the adjusting screw 104 to depress the valve stem 102 and to allow the valve stem 106 to rise sufficiently under the action of the spring 117 and the pressure of the water beneath the valve 105 to cause the valve 105 to become seated upon its seat 100. This position of the valves is diagrammatically shown clearly in Fig. 18. The stem 102 being thus depressed and the valve 101 being forced from its seat 99, water, under high pressure, is admitted through the pipe 150 and port 128 to the chamber 127 beneath the valve 101 and passing by said valve and over the seat 99 enters the chamber 119 above the valve 101, and thence the water passes through the port 120, passage 121 and port 122 to the chamber 123 beneath the valve 105, which is held on its seat by the spring 117 and by the high hydraulic pressure. From chamber 123, the water then passes through the port 129 and pipe 96, through the port 95 to the cylinder 9 (see also Fig. 1). The plunger or piston 11 will therefore be forced upwardly and the material will be compressed, molded or impressed between the matrices 76 and 77 of the lower and upper molds respectively. Sufficient material is placed between the platens to insure the filling of the molds. Whatever excess there may be of material will be squeezed or forced out from between the molds, particularly through the shallow cut away portions 75' of the plates 55 (see Fig. 11).

Referring now particularly to Figs. 25, 43 and 46, the sliding member 275 will, for a moment, be in the position shown in said Fig. 46 immediately after turning the handle 148 through its angle of 180°. By reason of the fact that the notch 284 is in the plane of the plate 288, the lug 291 does not engage either portion 282 or 283 of the web or rib 281, and, therefore, does not interfere with the inversion of the cylinder. It might also here be stated that when the cylinder 149 is in the position shown in Fig. 17, in which the handle is in its highest position, the lug 259 of the short heavy base 257 of the holder 256 is in engagement with the upper side of the web 294, and when said handle 148 is in its lowermost position as in Fig. 25, the lug 258 is in engagement with the underside of the web 294. Thus the lugs 258 and 259 and the web 294 limit the amount of rotative movement which may be given to the cylinder 149 and to the parts to which it is attached to substantially an angle of 180°.

To insure a perfect impression, and after that a proper cooling of the molds, the material should be held under the high pressure of the press for not less than a definite predetermined length of time. The length of time in which the platens and the molds carried thereby should be thus held in pressing position depends upon the characteristics and properties of the material being pressed or molded. For example, it may be found that to secure the best results, the material should be held between the molds say not less than half a minute, or not less than 45 seconds. The timer mechanism which will be now referred to, has for its object, the preventing of the operator from separating the platens and opening the press until at least that predetermined length of time has elapsed. Immediately upon being brought to the position shown in Fig. 46, and consequently, also that shown in Fig. 43, the shot 280 begin to flow through the opening 268 in the ring 266 and fall into the cup-shaped head 272. The heads, together with the sliding member 275, slowly settle or move downwardly within the casing or cylinder 149, the upper head 271 resting on the upper surface of the shot. The length of time which it takes for the sliding member 275 to thus move from its uppermost to its lowermost position, depends upon the amount of shot contained in the cylinder, and upon the size of the opening 268, in the ring 266, and these may readily be so arranged that the time through which the sliding member 275 is falling is that required for the imparting to the material between the platens of the press, a perfect impression, and a proper cooling of the pressed material, under pressure, say half a minute or three quarters of a minute, or whatever time may be required for this purpose. But while, as has been previously stated, the lug 291 did not interfere with the free rotation of the cylinder when the notch 284 of the web was in alinement therewith as shown in Fig. 45, upon being inverted to the position 46, the sliding member 275 and the web 281 connected thereto begins immediately to slowly settle and the lower end 286 of the portion 282 of the web 281 immediately enters between the lugs 290 and 291 of the plate 288, and so long as this wide portion 282 of the web is between said lugs, the cylinder may not be turned back again to the original position to cut off the supply of water under high pressure to the cylinder. In other words, the hydraulic pressure may not be cut off from the cylinder nor may the platens be separated from their pressing position until the notch 282 of the web comes again into the plane of the plate 288 or until it shall have arrived at the position shown in Fig. 47. Were it attempted, prior to the expiration of the time required for the sliding member 275 to move or fall from the position shown in Fig. 46 to that shown in Fig. 47, to turn the handle 148 back to its uppermost position, the wide portion of the web 281 would strike against the lug 290 of the plate 288 and would prevent the turning of the handle and operation of the parts actuated therefrom. In that position (Fig. 25) the lever 139 is still in engagement with the adjusting screw 104 holding the valve 101 off its seat and maintaining communication between the source of the hydraulic supply and the cylinder 9. Therefore, until a definite and predetermined time has elapsed, the operator, having once applied the hydraulic pressure to the piston or plunger 11, cannot relieve the piston of that pressure until so much time has elapsed as is required for the sliding member 275 to move from its uppermost to its lowermost position, which time is that required for the insuring of a perfect impression of the material in the press. Only a very short time, however, a few seconds, is generally required to obtain a perfect impression in the material between the molds, and after that short time has elapsed, the operator manipulates the duplex valve so as to cut off the supply of steam or other heating fluid to the molds, and to admit thereto a cooling fluid, such as water. This is done almost immediately after the water has been admitted to the cylinder to impress the material between the molds and immediately after the wide portion 282 of the web 281 has entered the notch 289 of the plate 288.

In order to cut off the supply of steam to the molds and to admit water thereto, the operator throws the lever 250 from the position shown in Fig. 31 through substantially an arc of 180°. Such movement allows the valve 160 to become seated on its seat 159 under the influence of the spring 166 and also under the pressure of the steam in the chamber 170. After the valve 160 is securely seated and the supply of steam therethrough is thus cut off, the adjusting screw 245 comes into engagement with the stem 184 and forces the valve 180 from off its seat 159. This valve 180 is in communication with and controls the flow of water through the manifold and to the molds. The course of the water through the duplex valve and manifold has been fully set forth in connection with a description of diagrammatic Fig. 42. The pipe 188 is in communication with a source of water supply, and when the valve 180 is off its seat, water passes through the duplex valve and manifold as shown in Fig. 42, making its exit from the manifold through the ports 220 and 221, passing through the pipes 87 and 92. to the upper and lower molds, following the same course through the molds as has been above described in connection with the flow of steam through said platens. The length of time required to form the impressions and to effect a cooling of the molded material between the matrices under pressure, is that required for the sliding member 275 to pass from the position shown in Fig. 46 to that shown in Fig. 47 and when it has arrived to the position shown in Fig. 47 the molds will have been cooled sufficiently to permit of the opening of the press and the removal of the record therefrom. The notch 282 being now in the plane of the plate 288, the lugs 290 does not now prevent the inversion of the cylinder 149, and this may be effected by turning the handle 148 upwardly in the direction of the arrow 154 of Fig. 17. This movement allows the valve 101 to move upwardly under the tension of the spring beneath it and the pressure of the water in the chamber 127 and to become seated on its seat 99, after which the lever 139 forces the valve 105 from its seat. The parts of the hydraulic valve are then back in the position shown in diagrammatic Fig. 19. The weight of the plunger 11 and the parts supported and carried thereby, supplemented by the tension of the springs 29, cause the plunger 11, the head 18 and the parts mounted thereon to slowly descend, forcing the water in the cylinder 9 beneath the plunger 11 out through the port 95 and pipe 96 to the port 129 and thence to the chamber 123 below the valve 105. The water then passes from the chamber 124 over the valve 105 to the port 125, thence through the passage 126 to the pipe 151 which leads to waste. The water is prevented from passing from the chamber 123 and port 122 by reason of the fact that the valve 101 is held on its seat mainly by the high pressure of the source of water supply supplemented somewhat by a spring, like the spring 117 (Fig. 17) on the other side of the hydraulic valve.

The operator next grasps the handle 57 and turns it on its pivot 56 from the position shown in Fig. 2 and in the direction of the arrow, through its full arc of movement, and this movement of the lever 57, by the action of the cam 55 and roller 54, forces the locking bars 49 and 50 out from under the locking lugs 3', 4', 5', 6'. The handle 57 is then lifted to swing the upper platen, and parts carried thereby, vertically and back to the position shown in Fig. 3.

During the pressing of the material between the molds, the locking bar 319 rests on the bottom of the transverse opening 314 in the lower platen 18 (as in Fig. 6) with the ends of the locking bar 319 lifted up out of engagement with the lugs 319', but as the plunger descends. after the release of the high pressure to the cylinder 9 and near the bottom stroke of the cylinder 9, the outer ends of the bar 319 strike against and rest upon the lugs 319', and thus the bar 319 and the center pin 310 and the center plate 307 will be held stationary. As the other parts controlled by the movement of the lower platen continue their downward movement as shown in Fig. 16, the finished record 319 will be lifted from the mold.

As soon as the cylinder 148 was reverted back from the position shown in Fig. 47 to that shown in Fig. 44, to cut off the high pressure from the cylinder and to allow the water in the cylinder to run to waste, the sliding member 275 begins to fall from the position shown in Fig. 44 and the wider portion 283 immediately enters into the notch 289 of the plate 288, thus preventing the re-application of hydraulic pressure to the members until the sliding member 275 shall have attained the position indicated in Fig. 45 with the notch 284 in the plane of the plate 288. As soon as the finished record is removed from the press, the operator immediately throws the handle 250 of the duplex valve and manifold toward the right; that is to say, to the position shown in Fig. 31, to re-heat the molds, but as has been explained above, he may not apply pressure to the parts until the length of time required for the sliding member 275 to move from the position shown in Fig. 44 to that shown in Fig. 45 has elapsed. This insures the molds being properly reheated before the operator can commence the repetition of the process to form the next record. Thus the timing device controls the operation of the press so as to allow sufficient time for both the heating of the molds preparatory to forming the record, and the cooling of the molds while the record is under pressure, so that it is not necessary in these matters to rely on the mere judgment of the operator. It might be stated that while in the foregoing description, no reference has been made to the putting of labels into the molds prior to the placing in the molds of the material to be molded, it is understood that the lower label 312 is placed upon the center plate 307 before the material to be molded is placed thereon and the upper label 312 is also placed in the upper mold prior to the closing of the press.

It is to be understood that while I have described the mechanism in which double faced records may be formed between the molds of the press, sound records having the record of sound in but one face thereof may be just as readily made in substantially the same manner. In pressing single faced disks or records, one of the matrices 76 and 77, will have a plane smooth surface as distinguished from one having a sound record groove therein, and the overhanging edge 79 of the ring 78 (see Fig. 15) will be of the thickness of a finished sound record disk, as distinguished from being of substantially one half the thickness of a sound record tablet, as is the case when double faced records are being formed in the press.

A feature or detail of construction which should perhaps be more particularly referred to at this time, is the manner in which the leaf 33, to which the upper mold is rigidly secured, is accurately positioned relatively to the lower mold preliminarily to the pressing of material in the press. As has been above stated, the upper platen or leaf 33 is mounted on the shaft 39 which in turn is mounted in boxes 40, 41 in the upper open ends 43 of the arms 7 and 8. Co-operating with this shaft 38 for the purpose of positioning the leaf or upper platen accurately above the lower platen, are two lugs 329, 330, best shown in Fig. 1, said lugs being integral with the bed 2. These lugs are preferably mounted toward the front part of the machine, preferably directly under the overhanging locking lugs 3′ and 5′ respectively, and the inner faces of said lugs are provided with horizontal surfaces 331 and 332 upon the top of which the leaf or upper platen rests when being locked in pressing position. The opposite sides of the upper platen or leaf 33 bear against the inner adjacent faces of the lugs 329 and 330 when in pressing position, the sides of said platen coming into engagement with said surfaces as the upper platen is swung downwardly around the axis of the shaft 38. The upper portions of the said upper surfaces 331 and 334 may be slightly inclined or beveled in order to assist in bringing the upper platen or leaf into alinement with the lower platen.

It will also be apparent that after having been positioned by the shaft 38 and the surface 333 and 334 above described, and after the locking bars 49, 50 have been moved to locking positions under the locking lugs 3′, 4′, 5′, 6′, the pressure of the plunger upwardly against the upper mold 31 is transmitted through the upper platen or leaf 33, and locking bars 49 and 50, directly to the locking lugs 3′, 4′, 5′, 6′. The shaft 39 serves mainly to assist in positioning the upper platen 33 and to form an axis about which said leaf or upper platen 33 may be swung.

Inasmuch as the journal boxes 40 and 41 are mounted in the open seats 42 and 43 on the arms 7 and 8 respectively, it will be apparent that the shaft performs no function of holding the leaf or upper platen rigid with respect to the bed during the pressing operation. The pressure exerted by the hydraulic plunger against the upper mold and the leaf upon which the same is mounted, is all taken up by the arms 3, 4, 5 and 6 through the locking bars 49 and 50 and the lugs 3′, 4′, 5′ and 6′. Should there be any play or looseness between the upper ends of the locking bars 49 and 50, the under surfaces of the locking lugs 3′, 4′, 5′, 6′ when the leaf or upper platen is locked, the shaft 39 and its journal boxes 40 and 41 are free to be moved by the pressure of the lower platen against it, slightly vertically or in a direction parallel to the direction of the motion of the plunger. The leaf or upper platen is locked independently of the shaft 39, the function of the shaft 39 being mainly to provide a pivot upon which the leaf may be swung upwardly to give access to the space between the platen, and to position the leaf forwardly and rearwardly with respect to the front of the press, to bring the molds into alinement with each other. The positioning of the leaf and the mold carried thereby transverse of the press, that is to say, to the right or left side of the press, in bringing the molds into alinement with each other is effected by the engagement of the sides of the leaf with the guiding surfaces 333 and 334 on the bed. If the upper portions of each of the said surfaces be slightly tapered, as above referred to, the leaf will be gently guided into proper alinement with the mold on the lower platen, but the lower parts of said surfaces 333 and 334 are preferably vertical surfaces, that is to say, they preferably lie in planes normal to the axis of the shaft 39, and in planes parallel to the direction of the motion of the plunger.

It is also to be observed that the upper mold is positioned with respect to the lower mold independently of the center pin. While the center pin is arranged in pressing such objects as disk records centrally of the record or matrix in which the record is formed, the positioning of the molds with respect to each other is effected, not by the pin, but by the guiding surfaces 333 and 334 engaging the opposite sides of the leaf and by the shaft 39 upon which the leaf or upper platen is pivoted.

It is to be observed that the valves proper of the hydraulic controlling valve, as well as the valves of the duplex valve and manifold for controlling the flow of heating and cooling fluids, are operated in part when moving from an open to a closed position by the pressure of the fluid passing therethrough, and that the fluid pressure acting on said valves, when closed, tends to hold the same firmly seated.

From the foregoing description of the various parts and the operation of the same, it will be plain that a minimum amount of motion is required of the plunger and the parts supported thereon to form a perfect impression of the material in the molds between the platens. Access to the space between the platens is attained by swinging the upper leaf or platen manually into and out of operative position with respect to the lower platen. The motion of the plunger is very small. This feature, therefore, permits of the use of high hydraulic pressure for the pressing operation (and with hydraulic pressure the motion of the plunger is usually slow), without a sacrifice of time. Were the hydraulic plunger itself required to move a distance sufficient to give the necessary space for access to the molds, a great deal of time would be wasted, but by making the actual travel of the plunger very short, the hydraulic press of this application may be operated just as fast as is consistent with the production of a perfect impression and safe removal of the finished product out from between the molds. The hydraulic press of this application may be manipulated just as fast as the material, which is molded in it, is capable of being molded.

While I have described the above mechanism as being particularly adapted for the pressing of sound record tablets, it is obvious that the same might be readily used for pressing other objects of thermoplastic or other materials. The form, size and surface of the articles formed in the press depends on the character and surface of the molds, dies or matrices, and the character of the material pressed or impressed between them. Many features of the said press or mechanism are applicable to presses generally, but certain features, which have been above described, are more or less peculiar to the manufacture of articles out of thermoplastic materials; that is to say, materials which, when heated, are soft and moldable and when cooled are hard and, generally speaking, incapable of being molded. Many changes in construction and arrangement may be made without departing from the spirit and scope of my invention.

Having thus described my invention, what I claim and desire to protect by Letters Patent of the United States is:

1. In a press, the combination of a bed, a cylinder rigid with respect to said bed, a plunger mounted in said cylinder, a mold operatively connected to said plunger, a second mold, a member to which said second mold is operatively connected, said member being movable with respect to said bed to bring said second mold into and out of alinement with said first mold, means to lock said member rigid with respect to said bed, means to supply a fluid under pressure to said cylinder, a valve for controlling the flow of said fluid under pressure to and from said cylinder, means to supply a heating and cooling fluid to said molds and a valve for controlling the flow of said heating and cooling fluids.

2. In a press, the combination of a bed, a cylinder rigid with respect to said bed, a plunger mounted in said cylinder, a mold operatively connected to said plunger, a second mold, a leaf on which said second mold is mounted, said leaf being pivotally connected with respect to said bed, means to lock said leaf rigid with respect to said bed, means to operate said plunger, and means for controlling the flow of heating and cooling fluids to said molds.

3. In a press, the combination of a bed, a cylinder rigidly mounted in said bed, a plunger mounted in said cylinder, a platen mounted on said plunger, a mold mounted on said platen, a second mold, a leaf on which said second mold is mounted, said leaf being pivoted with respect to said bed to bring said second mold into and out of alinement with said first mold, means to lock said leaf rigid with respect to said bed and means to operate said plunger.

4. In a press, the combination of a bed, a cylinder rigid with respect to said bed, a plunger mounted in said cylinder, a mold mounted on said plunger, a second mold movable into and out of alinement with said first mold, means to lock said second mold rigid with respect to said bed, a valve for admitting fluid under pressure to said cylinder to move said plunger, and said mold mounted thereon into pressing engagement with said second mold, and means to positively prevent the operation of said valve to admit fluid under pressure to said cylinder when said second mold is not rigidly locked with respect to said bed.

5. In a press, the combination of a bed, a cylinder rigid with respect to said bed, a plunger mounted in said cylinder, a platen operatively connected to said plunger, a mold mounted on said platen, a second mold, a member to which said second mold is operatively connected, said member being movable with respect to said bed to bring said second mold into and out of alinement with said first mold, means to lock said member rigid with respect to said bed, a valve for admitting fluid under pressure to said cylinder to move said plunger, and means, controlled by said means to lock said member, to prevent the opening of said valve to admit fluid under pressure to said cylinder when said member is not rigidly locked with respect to said bed.

6. In a press, the combination of a bed, a cylinder mounted rigid with respect to said bed, a plunger mounted in said cylinder, a mold operatively connected to said plunger, a second mold movable with respect to said bed into and out of alinement with said first mold, means to lock said second mold rigid with respect to said bed, a valve for permitting a fluid to flow into and to flow out of said cylinder to force said plunger and said mold connected thereto toward said second mold, and means to positively prevent the operation of said valve to permit the flow of the fluid from said cylinder until a predetermined time has elapsed after the operation of said valve to admit the fluid to said cylinder.

7. In a press, the combination of a cylinder, a plunger mounted in said cylinder, a hydraulic valve for controlling the flow of water to and from said cylinder, and a timing and locking mechanism to positively prevent the operation of said valve until a predetermined time has elapsed after said valve was previously operated.

8. In a press, the combination of a bed, a cylinder rigid with respect to said bed, a plunger in said cylinder, a member pivoted to said bed and movable into and out of alinement with said plunger, means to lock said member rigid with said bed, and in alinement with said plunger, a valve for admitting fluid under pressure to said cylinder, and for permitting of the escape of fluid from said cylinder, means to prevent the admission of fluid to said cylinder when said member is not rigidly locked with respect to said bed, and a timing and locking mechanism to positively prevent said valve from being operated to cut off the supply of fluid to said cylinder until a predetermined time has elapsed after the operation of said valve to admit fluid to said cylinder.

9. In a press, the combination of a bed, a cylinder rigidly mounted in said bed, a plunger mounted in said cylinder, a mold mounted on said plunger, a second mold, a leaf on which said second mold is mounted, said leaf being pivoted on said bed to swing said second mold into and out of alinement with said first mold, means to hold said leaf rigid with respect to said bed and the said molds in alinement with each other, a valve for permitting fluid under pressure to pass into and to pass out of said cylinder to move said plunger, means to prevent the operation of said valve to admit said fluid to said cylinder when said leaf is not held rigidly with respect to said bed, and means controlled by said means to hold said leaf rigid with respect to said bed to prevent the operation of said valve to allow said fluid to pass out of said cylinder until a predetermined time has elapsed after said valve is operated to admit fluid into said cylinder.

10. In a press, the combination of a bed, a cylinder rigid with respect to said bed, a plunger mounted in said cylinder, a mold operatively connected with said plunger, a second mold, a movable member on which said second mold is mounted, a center pin operatively passing through one of said molds and arranged to enter into the other of said molds, and means independent of said center pin to position said second mold in alinement with said mold mounted on said plunger.

11. In a press, the combination of a bed, a cylinder rigid with respect to said bed, a plunger in said cylinder, a platen operatively connected to said plunger, a second platen pivoted on said bed and movable into and out of alinement with said first platen, and a center pin mounted in one of said platens and arranged to coöperate with the other of said platens, said bed being provided with guiding surfaces engaging the opposite sides of said second platen, whereby said second platen is positioned in alinement with said platen on said plunger independently of said center pin.

12. In a press, the combination of a bed, a cylinder in said bed, a plunger in said cylinder, a platen operatively connected to said plunger, a shaft mounted on said bed extending normal to and out of alinement with the axis of said plunger, a platen pivoted on said shaft, a center pin mounted in one of said platens to coöperate with an opening in the other of said platens, said second platen being arranged to swing on said shaft into and out of alinement with the platen on said plunger, said bed being provided with guiding surfaces arranged substantially in the planes normal to the axis of said shaft and engaging the opposite sides of said second platen, and means independent of said shaft to lock said second platen rigid with respect to said bed in alinement with the said platen on said plunger.

13. In a press, the combination of a platen, a bed in which said platen is mounted, a second platen, and means to position said second platen with respect to the first mentioned platen, said means comprising a shaft upon which the second of said platens is pivoted to swing on an axis at right angles to the axis of said first mentioned platen, and guiding surfaces stationary with respect to said bed and operatively engaging the opposite sides of said second platen, said guiding surfaces being in planes substantially normal to said shaft.

14. In a press, the combination of a bed, a hydraulic plunger mounted in said bed, a platen operatively connected to said plunger, a mold carried by said platen, a platen pivoted to said bed, a mold mounted on said pivoted platen, means to lock said pivoted platen rigid with respect to said bed, means to apply hydraulic pressure to said plunger to move said first mentioned platen toward said second mentioned platen to press material between said molds, and means to prevent the application of hydraulic pressure to said plunger when said movable platen is not locked with respect to said bed.

15. In a press, the combination of a bed, a mold, a hydraulic plunger, a platen mounted thereon, a mold mounted on said platen, a second mold, a platen pivoted with respect to said bed and upon which said second mold is mounted, said pivoted platen and second mold being movable about an axis substantially horizontal and said first mentioned platen being movable in a direction substantially vertically, means to apply hydraulic pressure to said plunger to move said plunger and the said mold carried thereby toward said second mold, means to lock said pivoted platen rigid with respect to said bed, means to prevent the application of hydraulic pressure to said plunger whenever said pivoted plunger is not locked with respect to said bed, and means for admitting a heating or a cooling fluid to said molds simultaneously.

16. In a press, the combination of a bed, a platen, a plunger upon which said platen is mounted, a second platen, a pair of molds, one mounted on each of said platens, a valve having inlet and exhaust ports to control the flow of a fluid to and from said cylinder to move said plunger and the platen carried thereby toward and away from said upper platen to impress plastic material between said molds, and means to prevent the opening of the exhaust port of said valve after the inlet port has been opened until after a predetermined length of time has elapsed.

17. In a press, a platen, a plunger on which said platen is mounted, a second platen, a pair of molds, one on each of said platens, means to lock said second platen in a fixed position with respect to said first platen, means to apply fluid pressure to said plunger to force said first mentioned platen toward said second mentioned platen to mold plastic material between said molds, and means to prevent the release of fluid pressure to said plunger after the same has been applied until after a predetermined time has elapsed.

18. In a press, the combination of a platen, a plunger upon which said platen is mounted, an upper platen, means to lock said upper platen rigid with respect to said platen on said plunger, means to prevent the application of fluid pressure to said plunger until said upper platen is rigidly locked, and means to prevent the release of hydraulic pressure from said plunger after the same has been applied, or the reapplication of pressure thereto, after the same has been released, until after a predetermined time has elapsed.

19. In a press, the combination of a bed, locking members rigid with said bed, a platen, a plunger on which said platen is mounted, a second platen pivoted to said bed to swing into and out of registration with said first platen, rigid means connected to said bed and provided with locking lugs, said pivoted platen lying substantially between said first mentioned platen and said locking members when said pivoted platen is in alinement with said first mentioned platen, a locking bar mounted on said pivoted platen and slidable on said pivoted platen into and out of a position between said second platen and said locking members to lock said pivoted platen rigid with respect to said bed.

20. In a press, the combination of a bed, a plunger mounted in said bed, a platen mounted on said plunger, a second platen pivoted to said bed on an axis at right angles to and out of alinement with said plunger, locking members rigidly connected to said bed and provided with locking lugs, said pivoted platen being in a position substantially between said lugs and said platen mounted on said plunger when said pivoted platen is in pressing position with respect to said platen on said plunger, and a locking bar mounted on said pivoted platen and movable into and out of operative position between said locking lugs and said pivoted platen to lock said pivoted platen with respect to said bed, said locking bar being operable from the front of said press.

21. In a press, the combination of a plurality of platens each arranged to carry a mold respectively, fluid operated means moving one of said platens relatively to the other, means to control the operation of said fluid operated means, and a timing and locking device to lock said last mentioned means against movement until a predetermined length of time has elapsed after said fluid operated means have been operated.

22. In a press, the combination of a bed, a cylinder in said bed, a plunger mounted in said cylinder, a valve having inlet and exhaust ports to admit fluid under pressure to said cylinder and to allow the same to make its exit from said cylinder, a platen carried by said cylinder, a second platen, pivoted to said bed and springs between said bed and said plunger tending to force said fluid from said cylinder when the exhaust port of said valve is open.

23. In a press, the combination of a bed, a cylinder in said bed, a hydraulic plunger in said cylinder, a mold on said plunger, a second mold, means to lock said second mold rigid with respect to said bed, a valve having inlet and exhaust ports for controlling the flow of a fluid under pressure into and out of said cylinder, a lever for operating said valve, means controlled by said means to lock said second mold for positively preventing the operation of said means to control said valve until said second mold is locked with respect to said bed, and timing means, set in operation by the means to operate said valve, to prevent the operation of said valve to cut off a supply of fluid to said cylinder after the same has once been admitted, until a predetermined length of time has elapsed.

24. In a press, the combination of a bed, a plunger, means to supply an operating fluid to said plunger, including an inlet and an exhaust conduit, a normally closed valve in each conduit, means to operate said valves alternately, and a locking and timing mechanism to positively prevent the operation of said valve operating means until a predetermined length of time has elapsed after the previous operation of a valve.

25. In a press, the combination of a bed, a plunger, means to supply an operating fluid to said plunger, including an inlet and an exhaust conduit, a normally closed valve in each conduit, each of said valves being provided with an operating stem, a pivoted lever adapted to alternately operate each valve, means for operating said lever, and a locking and timing mechanism to positively prevent the operation of said lever until a predetermined length of time has elapsed after the previous operation of a valve.

26. In a press, the combination of a head, a platen on said head, a mold on said platen, a pivoted leaf, and a mold on said leaf, each of said molds comprising a plate and a spirally arranged groove in one face thereof, a cap secured to said face and closing the tops of said groove to form a spiral channel in said mold, a port communicating with the outer end of said spiral channel, a port communicating with the inner end of said spiral channel, and means to alternately admit heating and cooling fluids through said passage.

27. In a press, a mold provided with an interior spiral channel and provided on one face with a recess within which to secure a matrix and a continuous relatively narrow member having an opening therein of substantially the same shape as the contour of said recess and slightly overhanging said recess to firmly hold a matrix in said recess.

28. In a press, a mold provided in its interior with a spiral channel, a port communicating with the inner end of said channel, a port communicating with the outer end of said channel, said mold being provided on one face with a circular recess to receive a matrix, and a ring removably secured to said face and having its inner edge overhanging the outer edge of said recess.

29. In a press, the combination of a bed, a cylinder mounted in said bed, a plunger mounted in said cylinder, a mold operatively mounted on said plunger, a second mold, a leaf on which said second mold is mounted, said leaf being pivoted on said bed to bring said second mold into and out of registration with said first mold, means to lock said leaf rigid with respect to said bed and in registration with said first mentioned platen, and means for alternately admitting a heating and a cooling fluid to said platens simultaneously.

30. In a press, the combination of a bed, a platen, a plunger on which said platen is mounted, a second platen on said bed mounted to swing into and out of registration with said first platen, rigid means connected to said bed and provided with lugs, a locking bar mounted on said leaf, and means to move said locking bar on said leaf, when said leaf is in pressing position to bring the ends of said locking bar under said lugs.

31. In a press, the combination of a bed, a plunger mounted to move vertically in said bed, a mold operatively mounted on said plunger, a second mold, a counter-balanced leaf pivoted to said bed on a horizontal axis and upon which said second platen is mounted, and means to lock said leaf rigid with respect to said bed with said molds in registration with each other.

32. In a press, the combination of a bed, a cylinder in said bed, a plunger in said cylinder, a platen mounted on said plunger, a mold mounted in said platen, a second platen, a mold on said second platen, a shaft mounted in said bed and upon which said second platen is pivoted to swing into and out of a position in which said platens are in pressing position with respect to each other, means independent of said shaft to lock said second platen rigid in respect to said bed with said mold on said second platen in pressing position, means operable when said second platen is locked rigid with respect to said bed to admit fluid under pressure to said cylinder, and means to alternately heat and cool said molds.

33. In a press, a mold mounted to move in a right line, a second mold movable into and out of pressing position with respect to said first-mentioned mold, means to lock said second mold in pressing position, means to move said first mold toward said second mold when said second mold is so locked, and means to prevent said first mold from being moved toward said second mold when said second mold is not so locked.

34. In a press, a mold mounted to move in a right line, a mold movable into and out of alinement with said first-mentioned mold, means to lock said second mold in a position in alinement with said first mold, means to move said first mold toward said second mold, and means to prevent said first mold from being moved away from said second mold, after having been moved toward said second mold, until a predetermined time has elapsed.

35. In an apparatus, the combination of a bed, a platen, means mounted in said bed to support and carry said platen, said platen being movable in a right line, a shaft journaled in said bed, a second platen pivoted on said shaft, and movable about said shaft as an axis to bring said second platen into and out of pressing position with respect to said first-mentioned platen, said shaft being free to be moved with respect to said bed in a direction parallel to the movement of said first-mentioned platen.

36. In a press, the combination of a bed, a plunger mounted in said bed and movable in a right line, a platen mounted on said plunger, a second platen, means to position said second platen in alinement and registration with said platen on said plunger, and comprising a shaft mounted in said bed and extending in a plane normal to the direction of the movement of said plunger and upon which said second platen is pivoted to swing, and guiding surfaces on said bed between and into engagement with which the opposite sides of said second platen are brought as the second platen is swung on said shaft toward that position in which the platens are in alinement and registration with each other.

37. In a press, the combination of a bed, a plunger mounted in said bed and movable in a right line, a platen mounted on said plunger, a second platen, and means to position said second platen in alinement and registration with said platen on said plunger, said means comprising a shaft mounted in said bed and extending in a plane normal to the direction of the movement of said plunger, and upon which said second platen is pivoted to swing, and guiding surfaces on said bed between and into engagement with which the opposite sides of said second platen are brought as the second platen is swung on said shaft toward that position in which the platens are in alinement with each other, that portion of said surfaces into engagement with which the sides of said second platen are first brought being slightly tapered away from a plane normal to the axis of said shaft and the other portions of said surfaces being in planes substantially normal to the axis of said shaft.

38. In a press, the combination of a platen having a transverse opening therein, a bar loosely mounted in said opening, and a center pin adjustably and removably mounted in said bar.

39. In a press, the combination of a platen having a transverse opening therein, a bar loosely mounted in said opening, a clamping device mounted in said bar, a center pin adjustably and movably held in said clamping device, and means extending to the front of said press to open and close said clamping device.

40. In a press, the combination with an upper and a lower platen, of a duplex valve and manifold for alternately admitting simultaneously to said platens heating and cooling fluids, and conduits between said platens and said manifold, said duplex valve and manifold comprising an inlet for a heating fluid, a valve for controlling said inlet, a passage extending from said valve and terminating in two branches, a check valve in each of said branches, one of the said conduits extending from the upper platen to one of said branches, and communicating with said branch above the check valve located therein, the other of said conduits communicating with the lower platen and with the other of said branches at a point above the check valve therein, an inlet for cooling fluid, a valve for controlling said inlet, a passage leading from said valve and terminating in two branches, a check valve in each of said branches, said branches communicating with the aforesaid branches of the passage for said heating fluid at a point above said check valves in said branches of said passage for said heating fluid, and means to alternately open and close said valves controlling said inlets for the said heating and cooling fluids.

41. In a press, the combination with an upper and a lower platen, of a duplex valve and manifold for alternately admitting simultaneously to said platens heating and cooling fluids, and conduits between said platens and said duplex valve and manifold, said duplex valve and manifold comprising an inlet for a heating fluid, a valve for controlling said inlet, a passage extending from said valve and terminating in two branches, a check valve in each of said branches, one of the said conduits extending from the upper platen to one of said branches, and communicating with said branch above the check valve located therein, the other of said conduits communicating with the lower platen and with the other of said branches at a point above the check valve therein, an inlet for a cooling fluid, a valve for controlling said inlet, a passage leading from said valve and terminating in two branches, a check valve in each of said branches, said branches communicating with the aforesaid branches of the passage for said heating fluid at a point above said check valves in said branches of said passage for said heating fluid, and means to alternately open and close said valves controlling said inlets for the said heating and cooling fluids, one of said inlet valves being always closed when the other of said valves is open.

42. In a press, the combination of a platen, a plunger upon which said platen is mounted, an upper platen, means to lock said upper platen rigid with respect to said platen on said plunger, means to prevent the application of fluid pressure to said plunger until said upper platen is rigidly locked, and means to prevent the application of fluid pressure thereto, after the same has been released from said plunger, until after a predetermined time has elapsed.

43. In a press, the combination of a bed, a plunger mounted in said bed, a platen carried by said plunger, a second platen movable with respect to said bed, locking means to lock said second platen rigidly to said bed, a timer, a valve operatively connected to said timer for controlling the flow of fluid under pressure to and from said plunger, and means operated by said locking means, to permit or prevent the operating of said timer.

44. In a press of the character described, the combination of a plurality of platens, one of which is adapted to be moved toward and away from the other to effect the molding of a plastic material inserted in the press, means to move said movable platen, means for heating said platens and a timing and locking mechanism to prevent the operation of said moving means until said heating means has been operated for a predetermined length of time.

45. In a press of the character described, the combination of a plurality of platens one of which is adapted to be moved toward and from the other to mold a mass of plastic material inserted in the press, means to move said platens, means for cooling said platens when the same are in molding position, and a timing and locking mechanism to prevent the operation of said moving means operating to move said platen away from the other platen for a predetermined length of time.

46. In a press, the combination of a bed, a cylinder rigidly mounted in said bed, a plunger mounted in said cylinder, a mold mounted on said plunger, a second mold, a leaf on which said second mold is mounted, said leaf being pivoted on said bed to swing said second mold into and out of alinement with said first mold, means to hold said leaf rigid with respect to said bed and the said molds in alinement with each other, a valve for permitting fluid under pressure to pass into and to pass out of said cylinder to move said plunger, a timing and locking mechanism to prevent the operation of said valve to admit said fluid to said cylinder when said leaf is not held rigidly with respect to said bed, and means to prevent the operation of said valve to allow said fluid to pass out of said cylinder until a predetermined time has elapsed after said valve is operated to admit fluid into said cylinder.

47. In a press, the combination of a plurality of coöperating platens, means to supply a heating and cooling fluid to each of said platens, comprising a conduit connected to each platen and a manifold and duplex valve for controlling the supply of fluid passing through said conduits, said manifold having an inlet for the heating fluid, and a controlling valve therefor, a divided passage connecting said inlet valve with each of said conduits, and a check valve in each passage between the inlet valve and said conduits, said manifold being further provided with an inlet for a cooling fluid, a controlling valve therefor, a second divided passage connecting said cooling fluid inlet valve to said conduits through said first mentioned heating fluid passages above the check valves therein, a check valve in each of said cooling fluid passages and means to operate said controlling valves to control the flow of heating fluids to said platens.

In witness whereof I have hereunto set my hand this eighth day of December, A. D. 1913.

CLARENCE S. WICKES.

Witnesses:
CHARLES F. WILLARD,
JOHN D. MYERS.